US011771076B2

(12) United States Patent
    Zhou

(10) Patent No.: US 11,771,076 B2
(45) Date of Patent: Oct. 3, 2023

(54) FLIGHT CONTROL METHOD, INFORMATION PROCESSING DEVICE, PROGRAM AND RECORDING MEDIUM

(71) Applicant: SZ DJI TECHNOLOGY CO., LTD., Shenzhen (CN)

(72) Inventor: Jiemin Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 599 days.

(21) Appl. No.: 16/703,507

(22) Filed: Dec. 4, 2019

(65) Prior Publication Data

US 2020/0108931 A1   Apr. 9, 2020

Related U.S. Application Data

(63) Continuation of application No. PCT/CN2017/107650, filed on Oct. 25, 2017.

(30) Foreign Application Priority Data

Jun. 21, 2017   (JP) .................................. 2017-121429

(51) Int. Cl.
    *A01M 7/00*   (2006.01)
    *B64C 39/02*  (2023.01)
    (Continued)

(52) U.S. Cl.
    CPC ......... *A01M 7/0089* (2013.01); *B64C 39/024* (2013.01); *B64D 1/18* (2013.01);
    (Continued)

(58) Field of Classification Search
    CPC ............... A01M 7/0089; B64C 39/024; B64C 2201/027; B64C 2201/12; B64C 2201/141; B64C 2201/146; B64D 1/18; G05D 1/10
    See application file for complete search history.

(56) References Cited

U.S. PATENT DOCUMENTS

| 6,799,740 B2 * | 10/2004 | Heller ...................... B64D 1/16 244/136 |
| 2009/0026319 A1 * | 1/2009 | Strong ................... B64D 17/00 244/152 |

(Continued)

FOREIGN PATENT DOCUMENTS

| CN | 101927068 A | 12/2010 |
| CN | 204297079 U | 4/2015 |

(Continued)

OTHER PUBLICATIONS

Merino, An Unmanned Aircraft System for Automatic Forest Fire Monitoring and Measurement, 2011, Springer, J Intell Robot Syst (2012) 65:533-548 (Year: 2011).*

(Continued)

*Primary Examiner* — Elaine Gort
*Assistant Examiner* — Anthony M Gartrelle
(74) *Attorney, Agent, or Firm* — ANOVA LAW GROUP, PLLC

(57) ABSTRACT

A flight control method for controlling an aircraft includes obtaining wind information of an operation region during a spread operation performed by the aircraft. The flight control method also includes controlling a flight location of the aircraft based on the wind information and an allowable deviation of the spread region in the spread operation.

20 Claims, 32 Drawing Sheets

(51) Int. Cl.
 *B64D 1/18* (2006.01)
 *G05D 1/10* (2006.01)
 *B64U 10/13* (2023.01)
 *B64U 101/00* (2023.01)

(52) U.S. Cl.
 CPC .............. *G05D 1/10* (2013.01); *B64U 10/13* (2023.01); *B64U 2101/00* (2023.01); *B64U 2201/10* (2023.01); *B64U 2201/20* (2023.01)

(56) References Cited

U.S. PATENT DOCUMENTS

| | | | |
|---|---|---|---|
| 2014/0145040 | A1 | 5/2014 | Pflug et al. |
| 2016/0360744 | A1 | 12/2016 | Magidow et al. |
| 2020/0324895 | A1* | 10/2020 | Ghio .................. B64C 39/024 |

FOREIGN PATENT DOCUMENTS

| | | | | |
|---|---|---|---|---|
| CN | 204297097 | U | 4/2015 | |
| CN | 106335641 | A | 1/2017 | |
| CN | 106347666 | A | 1/2017 | |
| CN | 205998136 | U | 3/2017 | |
| CN | 106613571 | A1 | 5/2017 | |
| CN | 106716288 | A | 5/2017 | |
| CN | 106809391 | A | 6/2017 | |
| JP | H01317897 | A | 12/1989 | |
| JP | 2006176073 | A | 7/2006 | |
| JP | 2017033232 | A | 2/2017 | |
| WO | WO-2019013011 | A1 * | 1/2019 | .............. G05D 1/00 |

OTHER PUBLICATIONS

The World Intellectual Property Organization (WIPO) International Search Report for PCT/CN2017/107650 dated Mar. 14, 2018 11 pages.

* cited by examiner

|   | A  | B  | C  |
|---|----|----|----|
| I | P0 | P1 | P2 |
| II | P3 | P4 | P5 |
| III | P6 | P7 | P8 |

FIG. 11

FLIGHT CONTROL METHOD, INFORMATION PROCESSING DEVICE, PROGRAM AND RECORDING MEDIUM

CROSS-REFERENCE TO RELATED APPLICATIONS

This application is a continuation application of International Application No. PCT/CN2017/107650, filed on Oct. 25, 2017, which claims priority to Japanese Patent Application No. JP 2017-121429, filed on Jun. 21, 2017, the entire contents of both of which are incorporated herein by reference.

TECHNICAL FIELD

The present disclosure relates to a flight control method for controlling a flight of an aircraft, an information processing device, a program, and a recording medium.

BACKGROUND

Aircrafts flying in the sky have been implemented in areas such as aerial photography of an object from the sky, survey from the sky that measures terrain and objects such as buildings on the ground, and air transportation for transporting cargos to a destination through flight. In addition, aircrafts have been implemented for spread purposes, such as in agriculture, for carrying products to be spread such as pesticides and fertilizer, and for spreading the products to be spread onto objects such as crops.

As an example of the aircrafts that have been used in agriculture, patent document 1 discloses a rotor unmanned aerial vehicle, which includes four rotors, a supporting frame, a main control box, a windproof box, a fluid spraying box. The windproof box is mounted to a lower portion of the X type supporting frame, an outer end of which is mounted with the rotors. The fluid spraying box is provided in the windproof box.

RELATED TECHNOLOGY DOCUMENT

Patent Document

Patent Document 1: Chinese utility model No. 204297097.

SUMMARY

In the configuration of the aircraft described in Patent Document 1, because a large-sized windproof box is provided, the windproof box may become an obstacle when spraying the pesticides, which may cause the efficiency to be reduced. In addition, the windproof box may experience issues such as being affected by the wind during flight, adding weight to the aircraft body, etc.

According to an aspect of the present disclosure, there is provided a flight control method for controlling an aircraft. The flight control method includes obtaining wind information of an operation region during a spread operation performed by the aircraft. The flight control method also includes controlling a flight location of the aircraft based on the wind information and an allowable deviation of the spread region in the spread operation.

According to another aspect of the present disclosure, there is provided an information processing device for controlling a flight of an aircraft. The information processing device includes a controller configured to execute processing relating to control of the flight. The controller is configured to obtain wind information of an operation region when a spread operation is performed by the aircraft, and control a flight location of the aircraft based on the wind information and an allowable deviation of a spread region during the spread operation.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

FIG. 11 shows parameters of deviation characteristics of each type of the spreading object and the nozzle, according to an example embodiment.

DETAILED DESCRIPTION OF THE EMBODIMENTS

Figure 1:
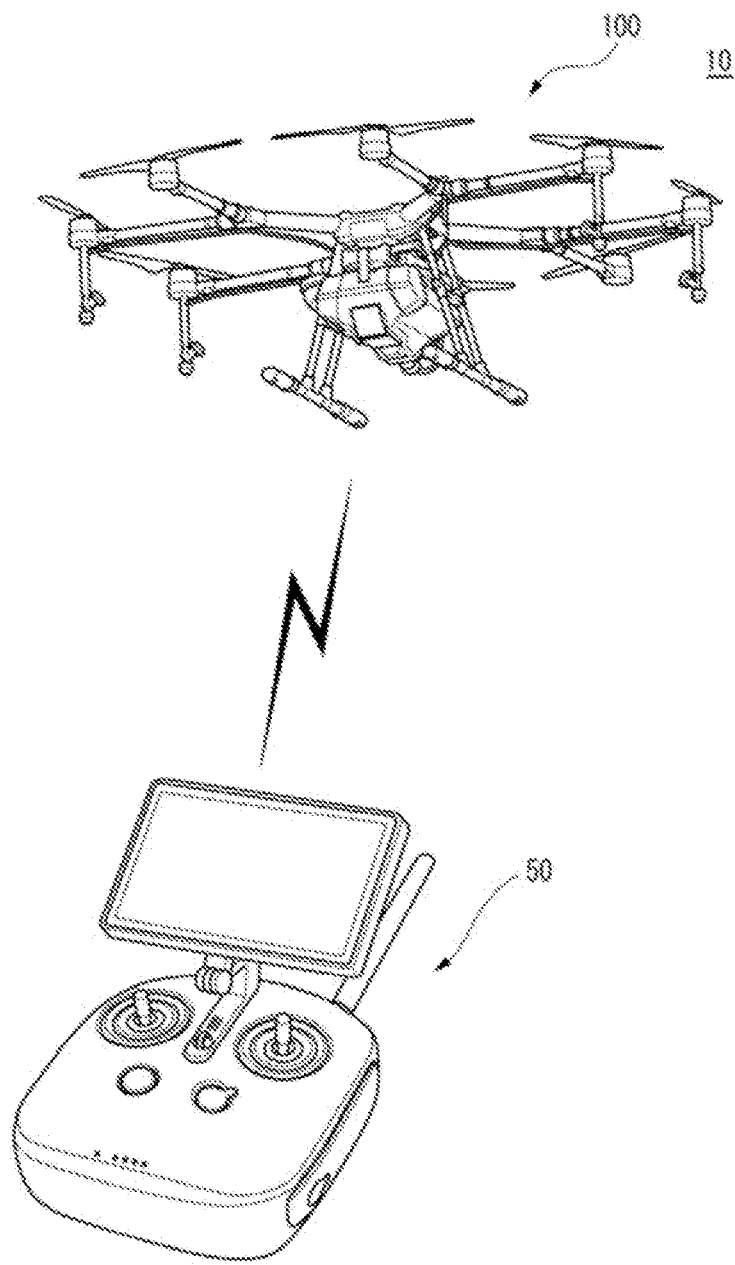
FIG. 1 is a schematic illustration of a configuration of a flight control system, according to an example embodiment.

Next, the present disclosure is described with reference to some embodiments. However, the embodiments described below do not limit the scope of the present disclosure, which is defined by the claims. The features described as a combination in the embodiments may not all be used in the technical solutions of the present disclosure.

The claims, specification, drawings, and abstract of this patent document contain materials which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The flight control method of the present disclosure includes various processes or steps implemented in an information processing device configured to control the flight of the aircraft. The aircraft may include any aerial vehicle that moves in the air (e.g., remote control unmanned airplane, helicopter). The aircraft may also be an unmanned aerial vehicle ("UAV"). The aircraft may fly along a predetermined flight path while performing a spread operation for spreading a spreading object such pesticides, fertilizers, water, etc.

The disclosed information processing device may be a computer, such as an information processing device included in the aircraft. The disclosed information processing device may include: a remotely controlled transmitter configured for instructing of various processes including the movement of the aircraft, or a terminal device configured to communicatively connect with the transmitter for the input and output of information and data, or various terminals (platforms) such as a terminal device configured to communicatively connect with the aircraft for the input and output of the information and data. The terminal may be a PC, a tablet terminal, a portable terminal, etc.

The disclosed program may be a program configured to enable the information processing device to execute various processes (steps).

The disclosed recording medium may be recorded with a program (e.g., a program configured to enable the information processing device to execute various processes (steps)).

The disclosed flight control system may include an aircraft as an example of a movable device, and a terminal (platform) configured to remotely control the actions or processing of the aircraft.

In the various embodiments of the present disclosure, the UAV is used as an example of the aircraft. In the accompanying drawings of the specification, the word "UAV" represents the unmanned aerial vehicle. In the following described various embodiments, the aircraft may set a flight path for substantially uniformly and completely spread a spreading object in an operation region that include a spread target such as the crops in a farm field.

In the following described various embodiments, the information processing device may generate, obtain, or change flight location information including at least one of a flight starting location, a flight ending location, a spread operation starting location, a spread operation ending location, a predetermined location along a flight path, a flight height, or a flight velocity. When the terminal includes the information processing device, the information processing device may communicate with the aircraft, and may transmit the flight location information to the aircraft. The "communication" referred to here means all data communications in a broad sense, which includes not only wired connections through cables, but also include wireless connections. In addition, the "communication" used herein not only includes direct communication between the information processing device and the aircraft, but also include indirect communication through the transmitter or the recording medium, etc.

FIG. 1 is a schematic illustration of a configuration of a flight control system 10, according to an embodiment. The flight control system 10 may include a UAV 100 and a terminal 50. The UAV 100 and the terminal 50 may communicate with one another through a wired communication or a wireless communication (e.g., Local Area Network ("LAN"), or Bluetooth®). The terminal 50 may be used by a human (referred to as "user" hereinafter) by the user holding the terminal 50 with two hands. The terminal 50 may be a transmitter, a tablet computer, a portable terminal, a PC, etc. The configuration of the terminal 50 may include a tablet terminal or a portable terminal mounted on a transmitter, which may be configured to communicate with one another.

Figure 2:
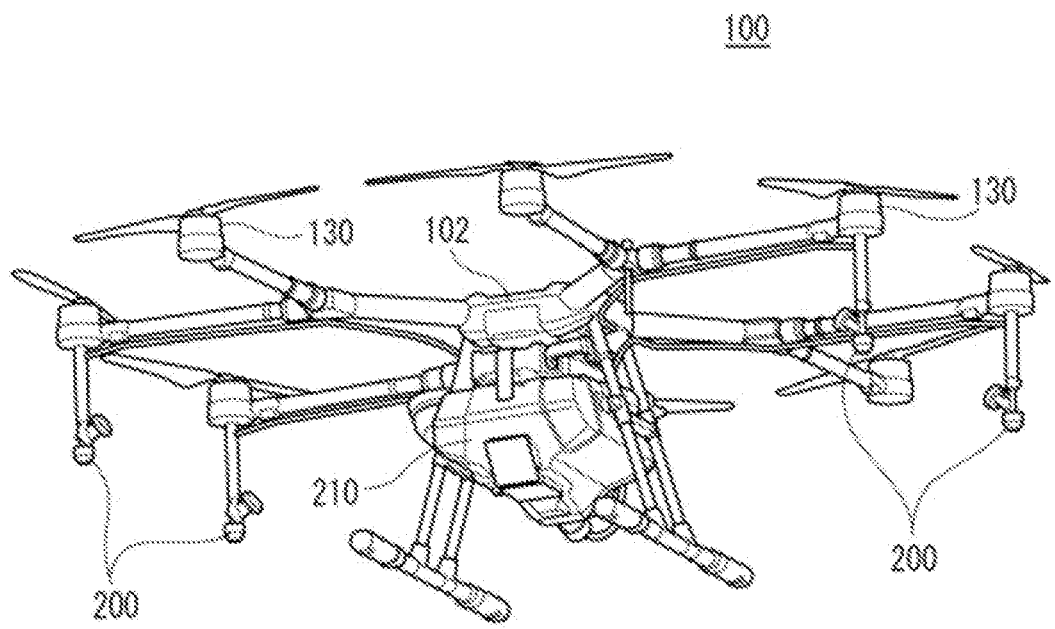
FIG. 2 is a schematic illustration of an appearance of an unmanned aerial vehicle ("UAV"), according to an example embodiment.

FIG. 2 shows an appearance of the UAV 100. The UAV 100 may fly over an operation region in which the spread operation is performed, to perform a spread operation of a spreading object such as a pesticide, a fertilizer, water, etc., to a spread target. The configuration of the UAV 100 may include a UAV body 102, a rotor mechanism 130, a nozzle 200, and a material storage tank 210. The UAV 100 may move along a predetermined flight path, or may move based on remote control instructions transmitted from the terminal 50. The movement of the UAV 100 refers to flight, at least including ascending, descending, rotating to the left, rotating to the right, translating to the left, and translating to the right.

The UAV 100 may include multiple rotor mechanisms 130 (propellers). For example, the UAV 100 may include eight rotor mechanisms 130. The UAV 100 moves by controlling the rotation of the rotor mechanisms 130. The number of rotor mechanisms 130 is not limited to eight. In some embodiments, the UAV 100 may include a fixed wing without a rotor mechanism.

Next, an example configuration of the UAV 100 will be described.

Figure 3:
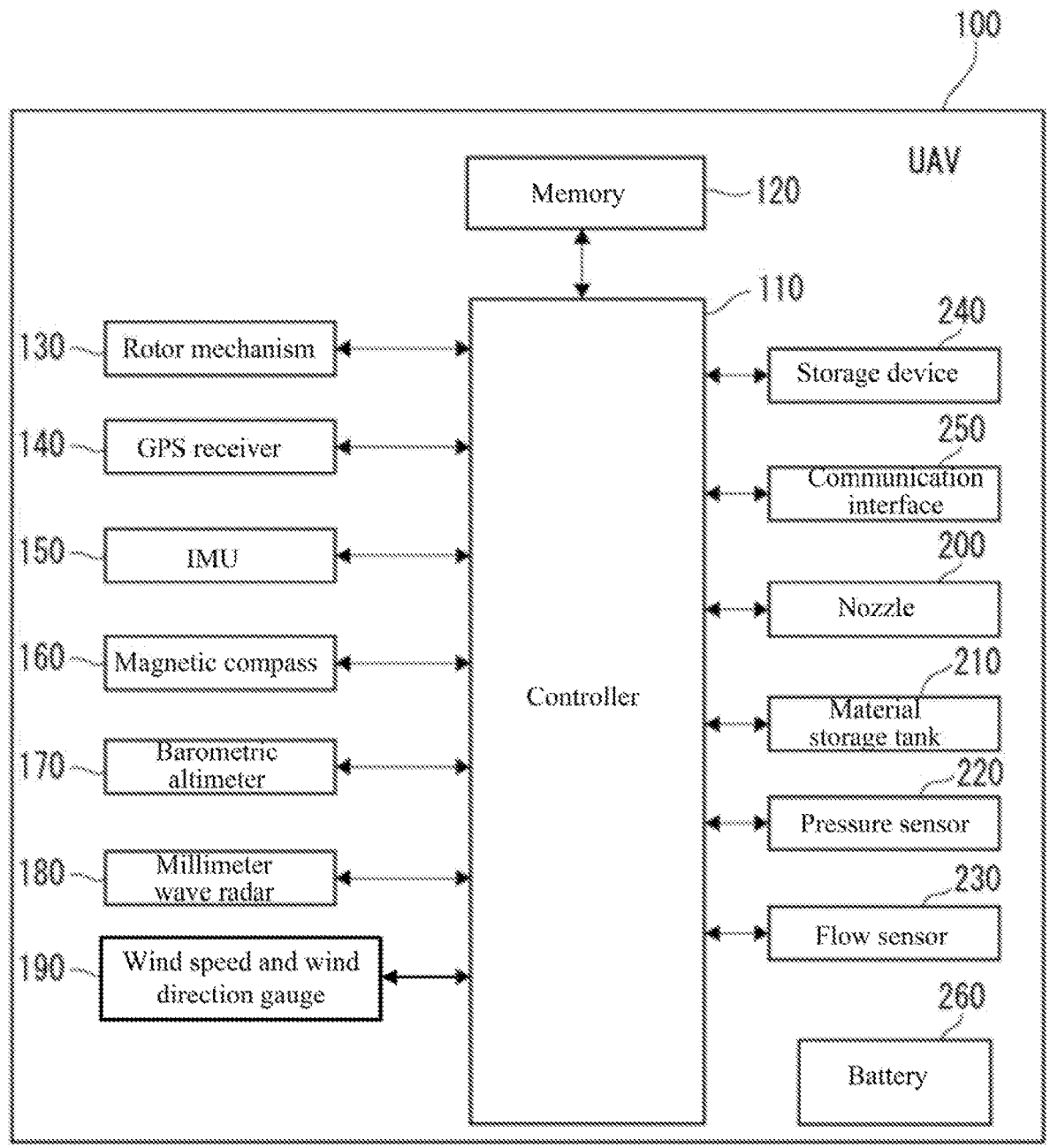
FIG. 3 is a schematic diagram of a configuration of hardware of the UAV, according to an example embodiment.

FIG. 3 is a schematic diagram of a hardware configuration of the UAV 100. The UAV 100 may include a controller 110, a memory 120, at least one rotor mechanism 130, a GPS receiver 140, an inertial measurement unit ("IMU") 150, a magnetic compass 160, a barometric altimeter 170, a millimeter wave radar 180, a wind speed and wind direction gauge 190, a nozzle 200, a material storage tank 210, a pressure sensor 220, a flow sensor 230, a storage device 240, a communication interface 250, and a batter 260. In addition, the UAV 100 may include an imaging device configured to capture an image of an object to be imaged.

The controller 110 may include a processor, such as a Central Processing Unit ("CPU"), a Micro Processing Unit ("MPU"), or a Digital Signal Processor ("DSP"). The controller 110 may be configured to control the signal processing of actions of various parts of the UAV 100, the input and output processing of data with various other parts, computation processing of data, and storage processing of data. The controller 110 may include a function to execute processing related to the control of the flight in the UAV 100.

The controller 110 may control the flight of the UAV 100 based on a program stored in the memory 120 or the storage device 240 and information related to the flight path. In addition, the controller 110 may control the movement (e.g., flight) of the UAV 100 based on instructions received from the remote terminal 50 through the communication interface 250.

The controller 110 may control the flight of the UAV 100 through controlling the rotor mechanism 130. That is, the controller 110 may control the latitude, longitude, and altitude of a location of the UAV 100 through controlling the rotor mechanism 130. The controller 110 may control the rotor mechanism 130 based on location information obtained by at least one of the GPS receiver 140, the IMU 150, the magnetic compass 160, the barometric altimeter 170, and the millimeter wave radar 180.

The memory 120 is an example of a storage member. The memory 120 may be configured to store one or more programs for controlling at least one of the rotor mechanism 130, the GPS receiver 140, the IMU 150, the digital compass 160, the barometric altimeter 170, the millimeter wave radar 180, the wind speed and wind direction gauge 190, the nozzle 200, the material storage tank 210, the pressure sensor 220, the flow sensor 230, the storage device 240, and the communication interface 250. The memory 120 may store various information and data that may be used during the processing executed by the controller 110. The memory 120 may be a computer-readable storage medium, which may include at least one of the flash memories, such as a Static Random Access Memory ("SRAM"), an Erasable Programmable Read Only Memory ("EPROM"), an Electrically Erasable Programmable Read-Only Memory ("EE-PROM"), and a USB storage device. The memory 120 may be disposed inside the UAV 100, or may be disposed as detachable from the UAV 100.

The rotor mechanism 130 may include multiple rotors and multiple driving motors for driving the multiple rotors to rotate. The rotor mechanism 130 may cause the rotor to rotate to generate an air flow of a specific direction, thereby controlling the flight (e.g., ascending, descending, horizontal movement, rotation, tilting, etc.) of the UAV 100.

The GPS receiver 140 may receive time received from multiple navigation satellites (e.g., GPS satellites) and multiple signals of the locations (e.g., coordinates) of the GPS satellites. The GPS receiver 140 may calculate the location of the GPS receiver 140 (i.e., the location of the UAV 100) based on the received multiple signals. The GPS receiver 140 may output the location information of the UAV 100 to the controller 110. In addition, the computation of the location information of the GPS receiver 140 may be performed by the controller 110, rather than by the GPS receiver 140. At this time, information including the time and the location of each GPS satellite from the multiple signals received by the GPS receiver 140 may be input into the controller 110.

The IMU 150 may be configured to detect the attitude of the UAV 100, and may output the detection result to the controller 110. The IMU 150 may detect accelerations in the fore-aft, left-right, and up-down directions, and angular velocities in directions of three axes: the pitch axis, the roll axis, and the yaw axis, and may use the detected information as the attitude of the UAV 100.

The magnetic compass 160 may be configured to detect a direction of a head (i.e., the heading direction) of the UAV 100, and may output the detection result to the controller. The barometric altimeter 170 may be configured to detect the flight altitude (i.e., height) of the UAV 100, and may output the detection result to the controller 110.

The millimeter wave radar 180 may be configured to transmit a high frequency electromagnetic wave in a millimeter wavelength band, and may measure a reflected wave that is reflected by the ground, an object, etc., to thereby detecting the location of the ground, object, and may output the detection result to the controller 110. The detection result may indicate the distance from the UAV 100 to the ground (i.e., height). In some embodiments, the detection result may also indicate the distance from the UAV 100 to the object. The detection result may indicate a terrain of an operation region where the UAV 100 performs a spread operation.

The wind speed and wind direction gauge 190 may be configured to detect a wind speed and a wind direction adjacent the UAV 100, and may output the detection result to the controller 110. The detection result may indicate the wind speed and the wind direction in the operation region in which the UAV 100 flies.

The nozzle 200 may be disposed at an end of a conduit for conveying a spreading object, such as a pesticide, a fertilizer, water, etc., and may be configured to spray the spreading object downwardly (e.g., in the vertical direction). The nozzle 200 may include multiple nozzle heads (e.g., 4). The nozzle 200 may be configured to adjust the on/off switch of the spray, the spray amount, and the spray speed based on the control by the controller 110. As such, the spreading object from the nozzle 200 may be spread toward the spread target at a predetermined spray amount and a predetermined spray speed. The material storage tank 201 may be configured to store the spreading object, such as the pesticide, the fertilizer, and water, etc. The material storage tank 210 may be controlled by the controller 110, and may deliver the spreading object to the nozzle 200 through the conduit. The nozzle 200 and the material storage tank 210 may be included in an example of the configuration of the spread mechanism.

The pressure sensor 220 may be configured to detect a pressure of the spreading object sprayed from the nozzle 200, and may output the detection result to the controller 110. The detection result may indicate, for example, a spray amount or a spray speed of the nozzle 200. The flow sensor 230 may detect a flow amount of the spreading object from sprayed by the nozzle 200, and may output the detection result to the controller 110. The detection result may indicate, for example, a spray amount or a spray speed of the nozzle 200.

The storage device 240 may be an example of a storage member. The storage device 240 may store various types of data and information. The storage device 240 may be a Hard Disk Drive ("HDD"), a Solid State Drive ("SSD"), a flash memory card, a USB storage device, etc. the storage device 240 may be disposed inside the UAV 100, or may be configured to be detachable from the UAV 100.

The communication interface 250 may communicate with the terminal 50. The communication interface 250 may receive various information related to the flight path and the spreading object from the terminal 50. The communication interface 250 may receive various instructions for the controller 110 from the terminal 50.

The battery 260 may function as a driving source for various parts of the UAV 100, to provide the power source to the various parts of the UAV 100.

Next, an example of the function of the controller 110 of the UAV 100 will be described.

The controller 110 may obtain the location information of the location of the UAV 100. The controller 110 may receive location information relating to the latitude, longitude, and altitude of the UAV 100 from the GPS receiver 140. The controller 110 may obtain latitude and longitude information indicating the latitude and longitude of the UAV 100 from the GPS receiver 140, and may obtain height information (or altitude information) indicating the height (or altitude) of the UAV 100 from the barometric altimeter 170 or the millimeter wave radar 180, and may use such information as the location information.

The controller 110 may obtain from the magnetic compass a heading information indicating a heading direction of the UAV 100. The heading information may indicate, for example, an orientation corresponding to the heading direction of the head of the UAV 100.

When the nozzle 200 spreads the spreading object, the controller 110 may obtain location information of a location the UAV 100 is supposed to be located. In some embodiments, the controller 110 may obtain, from the memory 120 or the storage device 240, location information of the location the UAV 100 is supposed to be located. In some embodiments, the controller 110 may obtain location information of the location the UAV 100 is supposed to be located from other devices, such as the terminal 50 through the communication interface 250.

The controller 110 may obtain spread region information indicating the region in which the spreading object is spread (hereinafter referred to as a "spread region"). The controller 110 may obtain the object-to-be-spread information indicating the type of the spreading object that is used, as a parameter for specifying the spread region. The controller 110 may obtain nozzle information indicating the type of the nozzle 200 that is used, as a parameter for specifying the spread region. The controller 110 may also obtain height information of the UAV 100, as a parameter for specifying the spread region. The controller 110 may also obtain the wind speed information adjacent the UAV 100, as a parameter for specifying the spread region. The controller 110 may obtain, from the IMU 150, attitude information indicating the attitude of the UAV 100, as information indicating the direction in which the spreading object is sprayed.

The controller 110 may obtain the wind speed information and the wind direction information adjacent the UAV 110 from the wind speed and wind direction gauge 190. The controller 110 may obtain, from other devices such as the terminal 50 through the communication interface 250, the wind speed information and the wind direction information adjacent the UAV 100, or the wind speed information and the wind direction information of the operation region in which the UAV 100 flies.

The controller 110 may estimate a spread region of the spreading object in an operation region of the spread operation based on latitude, longitude, and altitude of the location of the UAV 100, the type of the spreading object, the type of the nozzle 200, the attitude of the UAV 100, and the wind speed information and the wind direction information of the UAV 100.

The controller 110 may control at least one of an altitude of the UAV 100 during the spread operation, a starting location of the spread operation, an ending location, and a flight path of the spread operation, based on the estimated spread region of the spreading object.

Next, an example of the configuration of the terminal 50 will be described.

Figure 4:
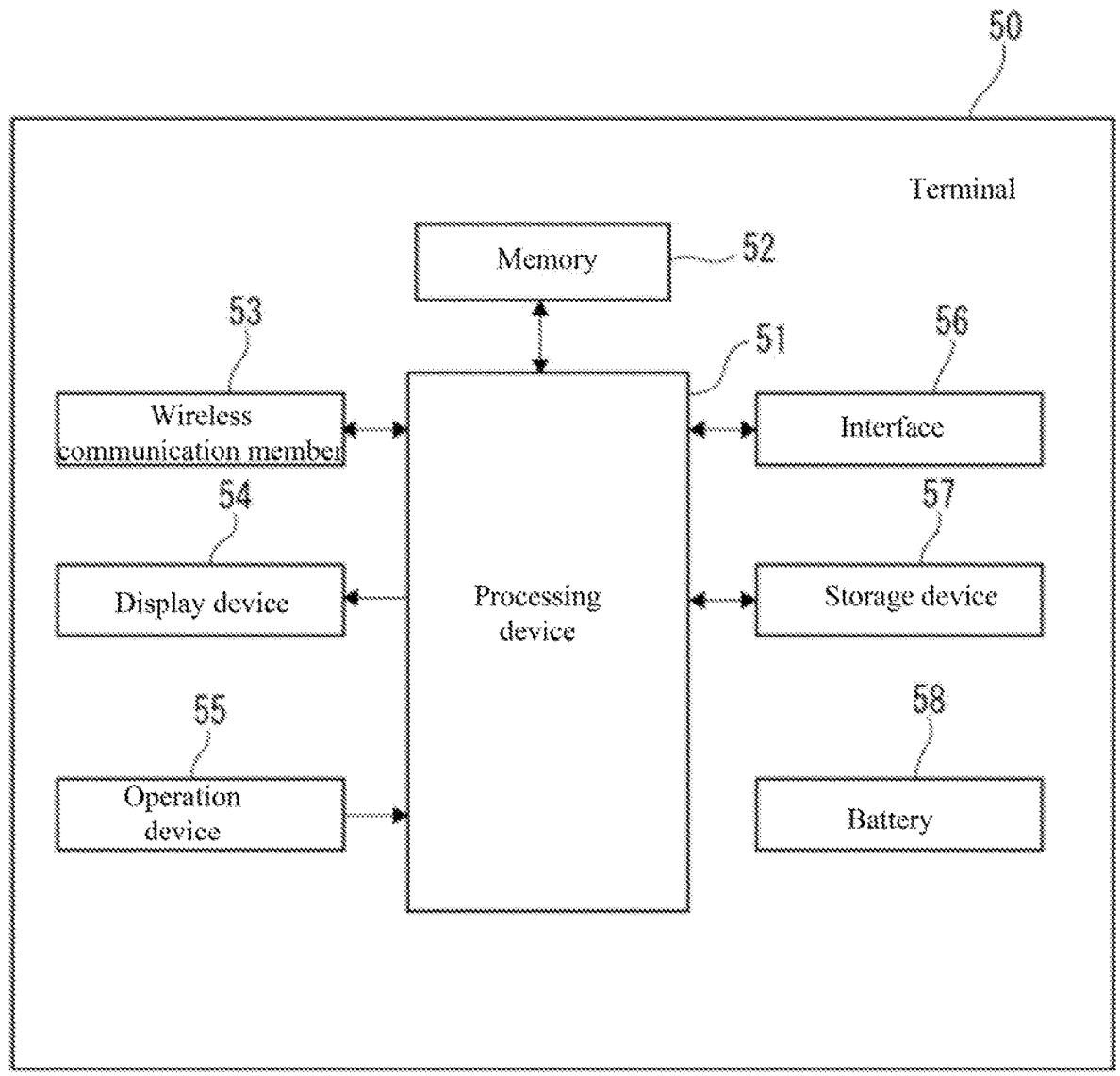
FIG. 4 is a schematic diagram of a configuration of hardware of a terminal, according to an example embodiment.

FIG. 4 is a schematic diagram of an example of the configuration of the hardware of the terminal 50. The configuration of the terminal 50 may include a processing device 51, a memory 52, a wireless communication device 53, a display device 54, an operation device 55, an interface 56, a storage device 57, and a battery 58. The terminal 50 may be an example of an information processing device having a function of an operation terminal configured to transmit instructions for remotely control the UAV 100. The terminal 50 may be an example of an information processing device having a function of a setting terminal configured to perform input and output of various information and data related to the flight of the UAV 100. In addition, the terminal 50 may have a separate body configuration, such as a transmitter and a tablet terminal or a portable terminal connected with one another.

The processing device 51 may include a processor (e.g., a CPU, MPU, or DSP). The processing device 51 may be configured to control the signal processing of actions of various parts of the control terminal 50, the input and output processing of data with various other parts, computation processing of data, and storage processing of data.

The processing device 51 may obtain data and information from the UAV 100 through the wireless communication device 53. The processing device 51 may data and information from other devices through the interface 56. The processing device 51 may obtain the data and information input through the operation device 55. The processing device 51 may obtain data and information stored in the memory 52. The processing device 51 may transmit the data and information to the display device 54, and to cause the display device 54 to present display information based on the data and information. The processing device 51 may transmit the data and information to the storage device 57, and may store the data and information in the storage device 57. The processing device 51 may obtain data and information stored in the storage device 57.

The processing device 51 may perform at least one of, based on an operation input through the operation device 55, setting of the type of the spreading object, setting of the type of the nozzle 200, setting of the operation region of the spread operation, setting of the flight path of the operation region, and setting of the starting location (initial location) and the ending location (final location) of the spread operation.

The processing device 51 may generate an operation signal for remotely controlling the movement of the UAV 100 based on an operation input of the operation device 55. The processing device 51 may use the operation signal as instructions for the movement control, and may transmit the operation signal to the UAV 100 through the wireless communication device 53, to remotely control the UAV 100.

The processing device 51 may generate a display screen of at least one of a setting screen and an operation screen that is to be displayed on the display device 54.

The memory 52 is an example of the storage device. The memory 52 may include a Read Only Memory ("ROM") configured to store a program defining actions of the processing device 51 and data of setting values, and a Random Access Memory configured to temporarily store various information and data used by the processing device 51 when the processing device 51 performs processing. The program and data of the setting values stored in the ROM of the memory 52 may be copied to a predetermined storage medium (e.g., a CD-ROM, DVD-ROM). The RAM of the memory 52 may store various flight information, such as the operation region of the spread operation performed by the UAV 100, the flight path, and the flight height, etc.

The wireless communication device 53 may communicate with the UAV 100 through various wireless communication methods, to receive and transmit information and data. The wireless communication methods may include, for example, wireless LAN, Bluetooth®, near field wireless communication, or public wireless network. The wireless communication device 53 may communicate with other devices to receive and transmit information and data.

The display device 54 may include a Liquid Crystal Display ("LCD"), or an organic Electro Luminescence ("EL") display, and may be configured to display various information and data output by the processing device 51. The display device 54 may include a display light such as one that uses Light Emission Diode ("LED"). The display light may display, for example, at least one of the wireless connection status between the UAV 100 and the terminal 50, the start-up status of the UAV 100, the remaining battery capacity of a battery of the UAV 100 or the terminal 50.

The operation device 55 may receive operation instructions or data, information input by a user holding the terminal 50. The operation device 55 may include an operation rod, a button, a key, a touch screen display, a microphone, etc. The operation device 55 may be used by the user in the operations for remotely controlling the movement of the UAV 100 (e.g., the fore-aft movement, left-right movement, up-down movement, and heading direction change of the UAV 100). The operation device 55 may be used in inputting various settings related to the spread operation. The operation device 55 may also be used in operations for indicating the start of the spread operation.

The interface 56 may be configured to perform the input and output of information and data between the terminal 50 and other devices. The interface 56 may be a USB port (not shown) provided on the terminal 50. The interface 56 may be an interface other than the USB port.

The storage device 57 may be an example of a storage member. The storage device 57 may store and save all kinds of data and information. The storage device 57 may be a flash memory, a Solid State Drive ("SSD"), a memory card, a USB storage device, etc. The storage device 57 may be configured to be detachable from the main body of the terminal 50.

The battery 58 may function as a driving source of various parts of the terminal 50 to provide the power source to the various parts.

Next, the effect of wind on the spread operation performed by the UAV 100 will be described.

Figure 5:
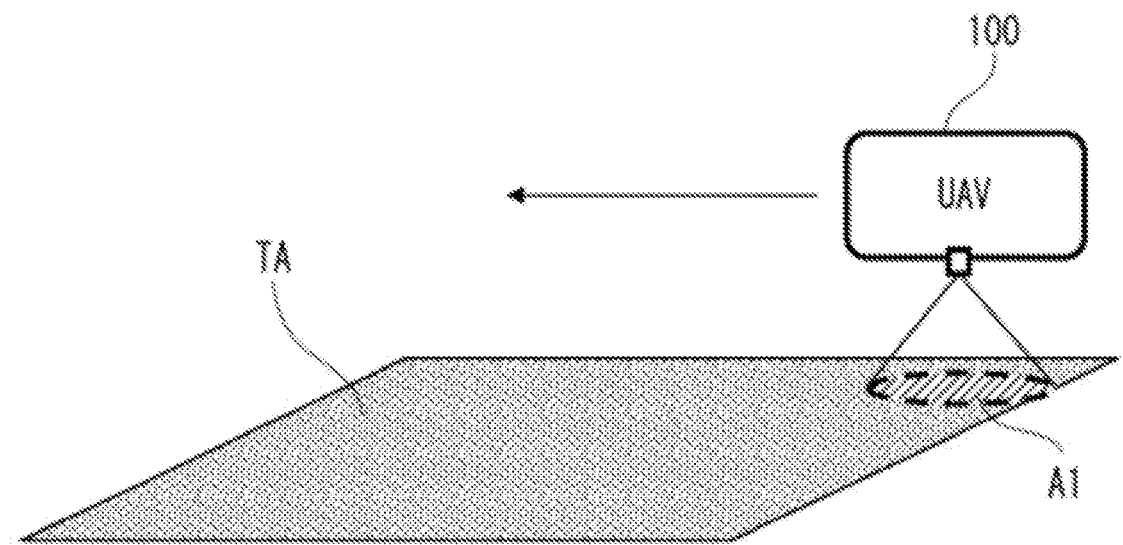
FIG. 5 is a schematic illustration of a spread operation using the UAV, according to an example embodiment.
Figure 6:
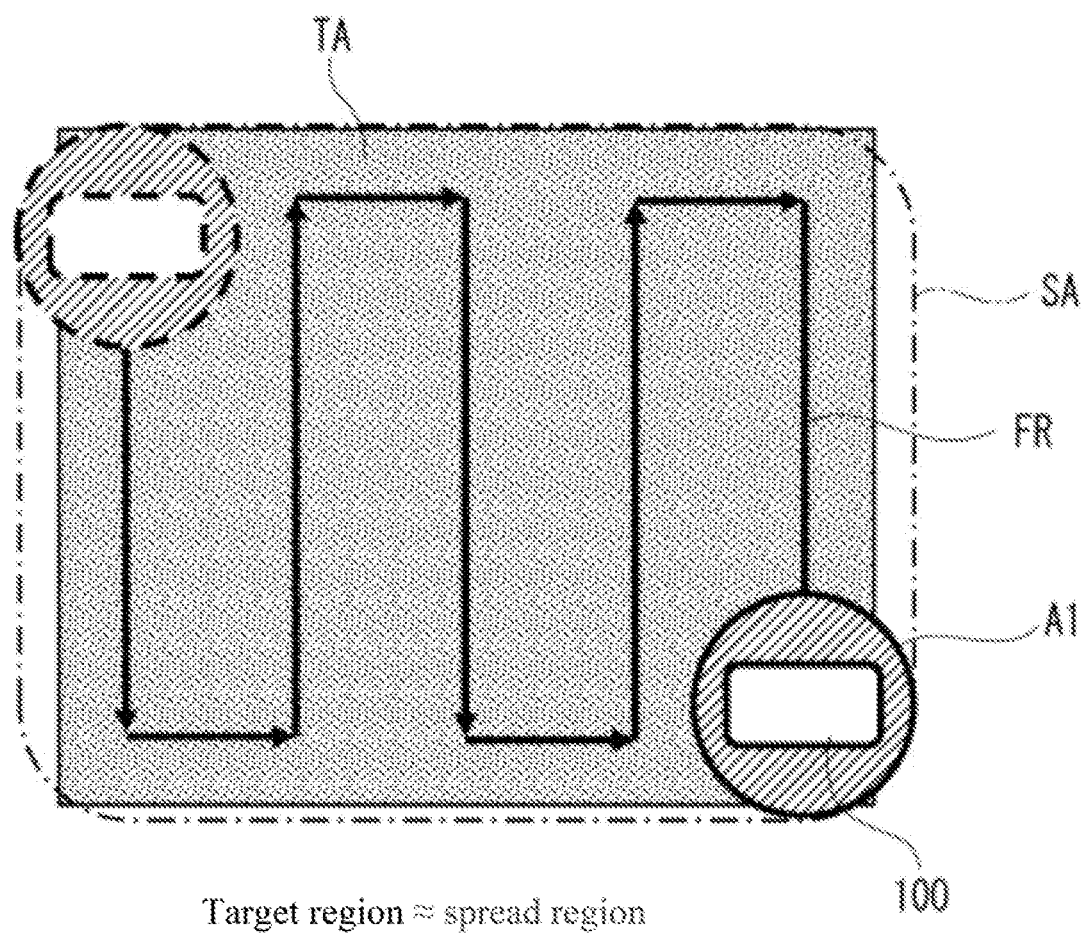
FIG. 6 is a schematic illustration of a spread region of a spread operation using the UAV, according to an example embodiment.

FIG. 5 is a schematic illustration of a situation of a spread operation performed by the UAV 100. FIG. 6 is a schematic illustration of a spread region of a spread operation performed by the UAV 100.

The UAV 100 flies in the sky over the operation region TA in a spread operation to spread a spreading object, such as a pesticide, a fertilizer, a weed killer, and water. When performing the spread operation, the UAV 100 may fly along a predetermined flight path FR such as a path of a meandering shape in the operation region TA, such that the UAV 100 can substantially uniformly spread the spreading object in the operation region TA. In the spread operation, when there is no wind in the operation region TA, the spreading object may be spread in a region A1 right below the UAV 100. At this moment, the target region of the spread operation in the operation region TA is substantially consistent with the actual spread region SA, such that the spreading object can be suitably spread to the spread target.

The region in which the spreading object is spread may be significantly affected by three factors, (1) wind, (2) spread height, and (3) type of the spreading object (e.g., size of the granularity) and the type of the nozzle. Therefore, in a spread operation, if the type of the spreading object and the type of the nozzle are pre-set, then the region to be spread may be determined based on the wind speed and height during the spread operation. The spread region may change base on whether there is wind. Therefore, when the wind in the operation region is relatively strong, it may be possible that the expected spread operation may not be accomplished, the operation efficiency is reduced, the operation cost is increased, adverse effect may be caused to the crop outside of the operation region.

Figure 7:
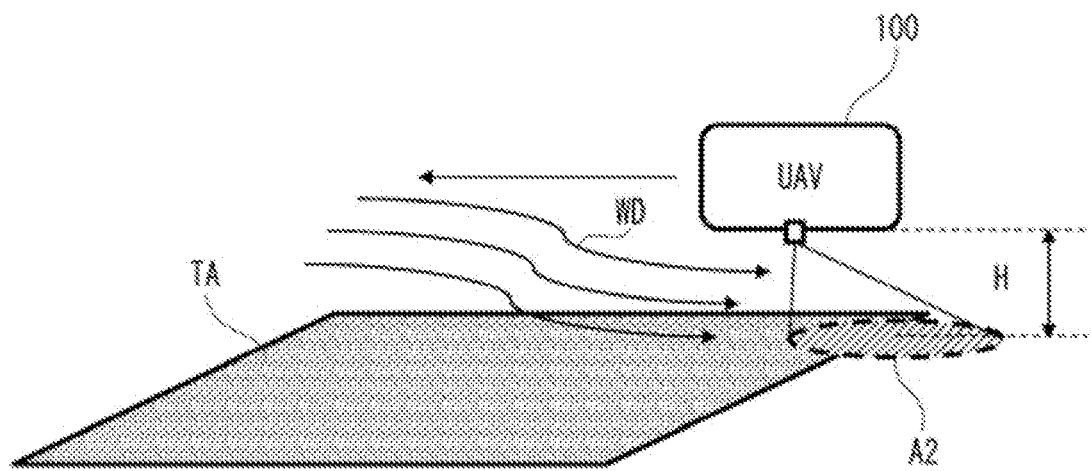
FIG. 7 is a schematic illustration of a situation of the spread operation using the UAV when there is an effect by the wind, according to an example embodiment.
Figure 8:
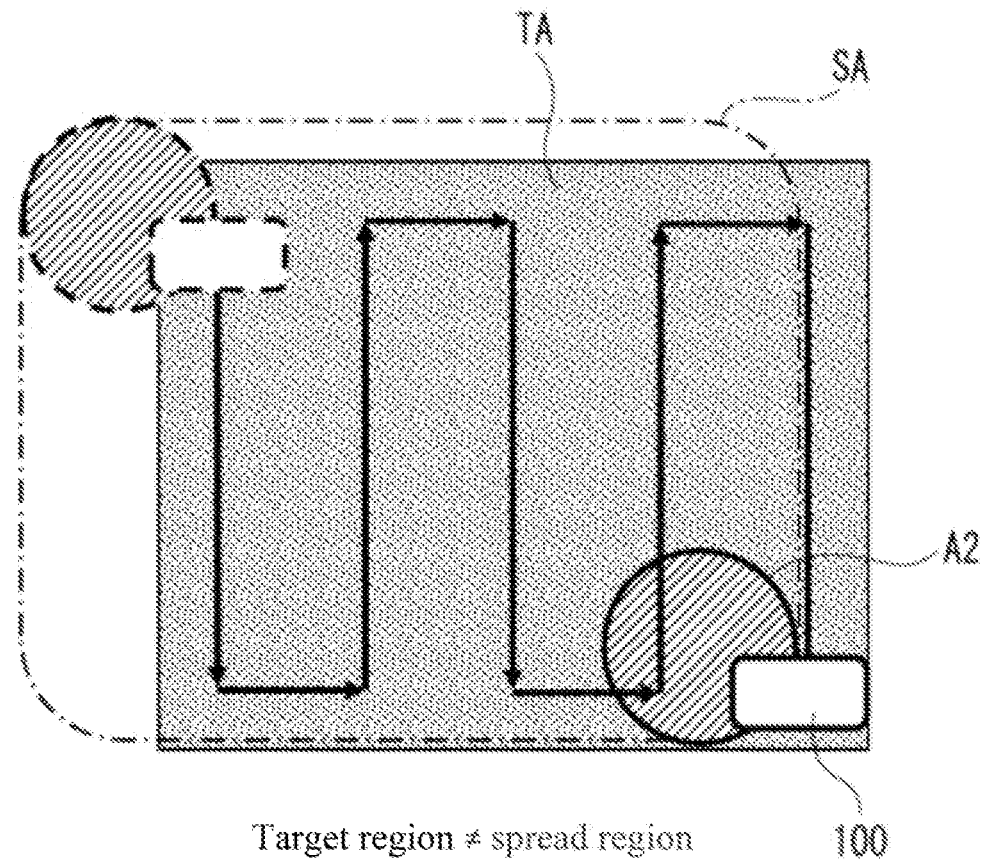
FIG. 8 is a schematic illustration of a spread region of the spread operation using the UAV when there is an effect by the wind, according to an example embodiment.

FIG. 7 is a schematic illustration of a situation of the spread operation using the UAV 100 when there is a wind effect. FIG. 8 is a schematic illustration of a spread region in a spread operation in which the UAV 100 is used when there is a wind effect.

In a spread operation, when there is wind WD in the operation region TA, because of the wind speed and height H of the wind WD during the spread operation, the spreading object may be spread to a region A2 located away from the location right below the UAV 100. At this moment, the target region of the spread operation in the operation region TA may deviate from the actual spread region SA. As a result, it is possible that the spreading object may deviate from the spread target and a region may be left uncovered by the spreading object, hence the expected spread operation may not be accomplished. The stronger the wind and the higher the height, the larger the deviation between the target region of the spread operation and the actual spread region.

Next, embodiments of the disclosed flight control method will be described with reference to the accompanying drawings. The disclosed flight control method may include obtaining wind information, such as the wind speed and wind direction of an operation region during the spread operation, and controlling the flight location of the UAV 100 based on the wind information. The flight location control may include at least one of adjusting the flight height, and adjusting the starting location (e.g., the initial location) of the spread operation.

Figure 9:
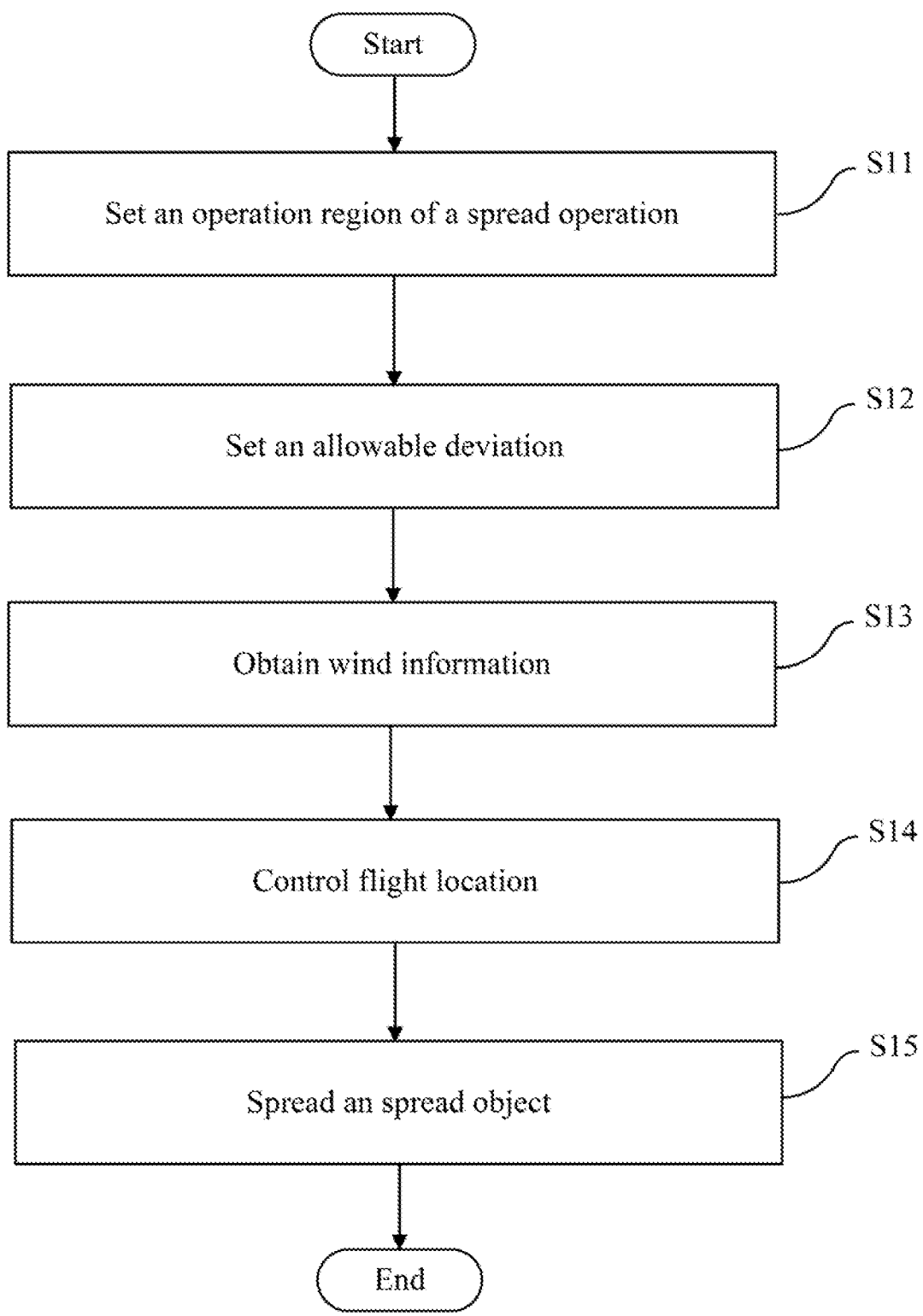
FIG. 9 is a flow chart illustrating a flight control method, according to an example embodiment.

FIG. 9 is an example flow chart illustrating the processing orders of the flight control method, according to an embodiment. In this example, the controller 110 of the UAV 100, which is an example of a controller of an information processing device, may automatically execute the processing. Alternatively or additionally, the controller of the information processing device may the controller 110 may cooperate with the controller 110 of the UAV 100 or may replace the controller 110 of the UAV 100. The processing may be executed by the information processing device included in the terminal 50 that may be communicate with the UAV 100.

The controller 110 may set the operation region of the spread operation based on the instruction input by the user (S11). The controller 110 may set the type of the spread object and the type of the nozzle based on the instruction input by the user. In addition, the controller 110 may set an allowable deviation in the spread region based on the operation region (S12). The allowable deviation of the spread region may be determined by the user based on the situation of the spread target, and the situation of the surroundings of the operation region, and may be set based on an instruction input by the user. Alternatively, the allowable deviation may be set through a parameter predetermined based on the operation region. The allowable deviation of the spread region indicates a difference between a target region in the operation region to which the spread target is spread with the spread object and an actual spread region to which the spread object is spread. The allowable deviation may include at least one of an allowable deviation range and a maximum allowable deviation.

The controller 110 may obtain the wind information adjacent the UAV 100 when the UAV 100 flies through the operation region, based on the detection result of the wind speed and wind direction gauge 190 (S13). The wind information may include at least one of wind speed information and wind direction information. The wind information may include at least one of an average wind speed and an instant wind speed. The controller 110 may obtain the wind information from other devices such as the terminal 50.

The controller 110 may control the flight location based on the wind information and the allowable deviation (S14). With respect to the control of the flight location, the controller 110 may execute at least one control processing of adjusting a flight height and adjusting a starting location (e.g., the initial location) of the spread operation.

The controller 110 may control the nozzle 200 to spray the spread object stored in the material storage tank 210, thereby executing the spread operation (S15).

Therefore, based on the wind information of the operation region, flight controls, such as reducing the flight height when the wind speed is above a predetermined wind speed, and moving the operation starting location based on the wind speed and the wind direction, may be performed by the controller 110 on the UAV 100, thereby carrying out the spread operation in a suitable manner.

Here, the allowable deviation of the spread region will be explained.

Figure 10:
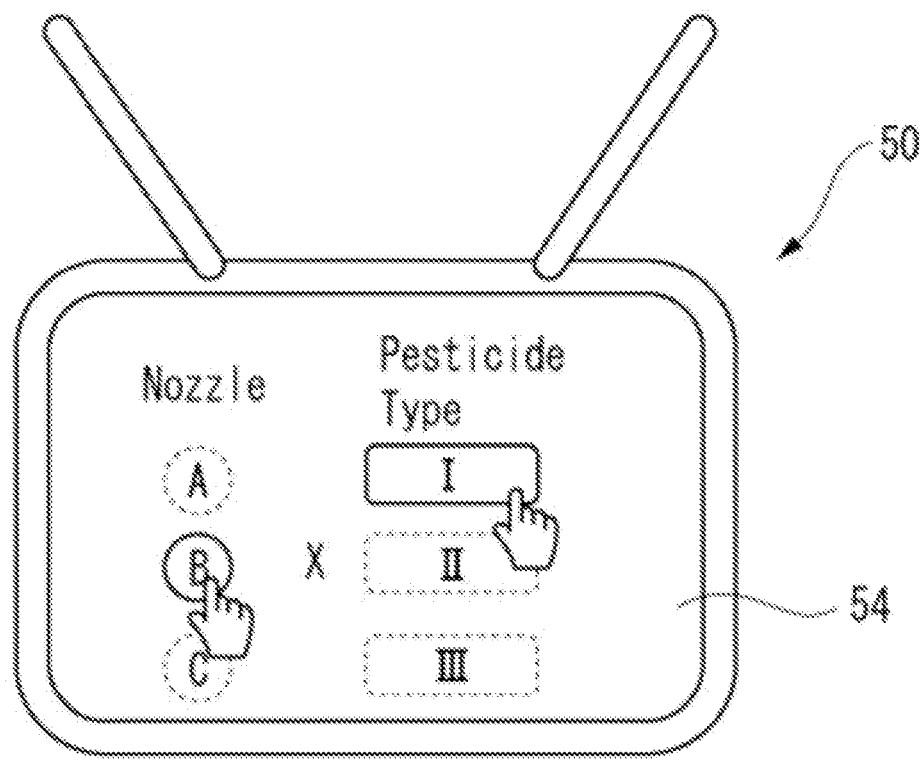
FIG. 10 is a schematic illustration of a graphical interface for setting a type of a spreading object and a type of a nozzle, according to an example embodiment.
Figure 11:
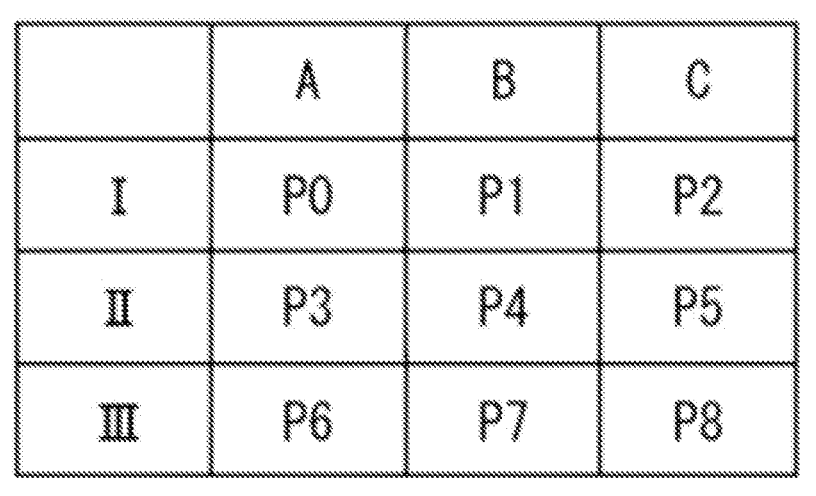
Figure 12:
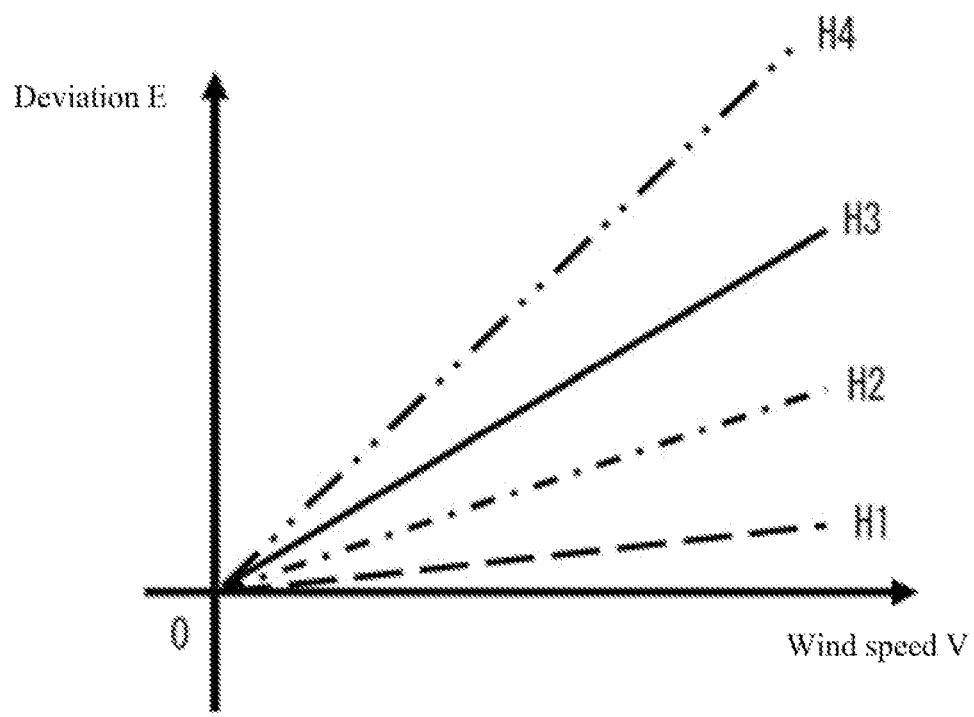
FIG. 12 is a schematic illustration of parameters of deviation characteristics of the spread region, according to an example embodiment.

FIG. 10 is a schematic illustration of a screen for setting the type of the spread object and the type of the nozzle. FIG. 11 is a schematic illustration of a parameter indicating a deviation characteristic of each type of the spread object and the nozzle. FIG. 12 is a schematic illustration of a parameter indicating a deviation characteristic of the spread region.

When the user performs the setting related to the spread operation, the terminal 50 may display a setting screen on the display device 54. FIG. 10 illustrate an example of the setting screen for setting the type of the spread object and the type of the nozzle, showing a situation where the user selects and sets pesticides I and nozzle B. As shown in FIG. 11, through the combination of the spread object and the nozzle, the parameter of the deviation characteristic of the spread region may be defined. For example, a deviation parameter P1 may be suitable for the combination of pesticide I and nozzle B. Each of parameters P0 to P8 is a parameter that defines the change characteristics of the deviation in a spread region corresponding to the wind speed for each height. For example, as shown in FIG. 12, at each of heights H1 to H4, corresponding to the wind speed V, the change characteristics of the deviation E in the spread region are defined. In addition, the deviation parameters P0 to P8 may also function as a parameter that defines the change characteristics of a deviation of the spread region corresponding to the height at which the spread is performed corresponding to each wind speed. That is, each of the deviation parameters P0 to P8 may be represented as a function that represents the effect of the height and wind speed on the deviation of the spread region. Each deviation value of a predetermined value may be stored in the form of a table.

Figure 13:
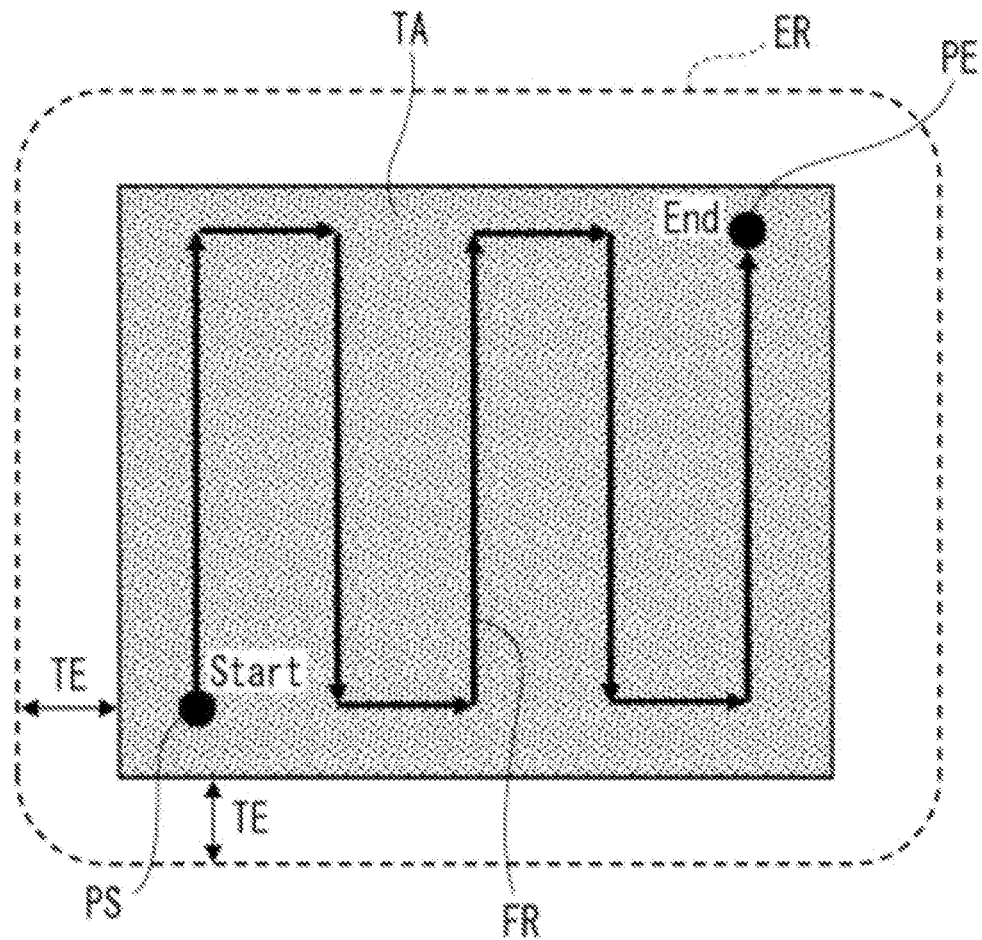
FIG. 13 is a schematic illustration of an allowable deviation range of the spread region, according to an example embodiment.
Figure 14:
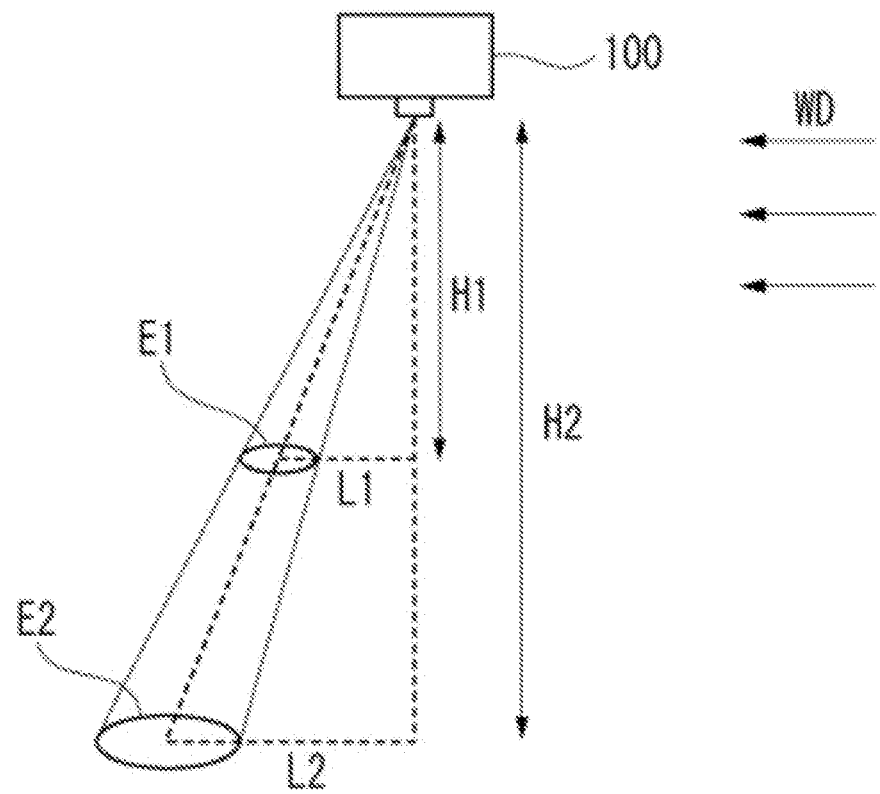
FIG. 14 is a schematic illustration of a relationship between a height at which the spread is performed and the deviation of the spread region, according to an example embodiment.

FIG. 13 is a schematic illustration of an allowable deviation range of a spread region. FIG. 14 is an illustration of a relationship between the deviation of the spread region and the height at which the spread is performed.

In a spread operation, the operation region TA of the spread operation, the operation starting location (initial location) PS, and the operation ending location (final location) PE may be set by the user. The controller 110 may determine the flight path FR to adapt to the operation region TA. In addition, the controller 110 may set, with respect to the operation region TA, the allowable deviation TE of the spread region and an allowable deviation range ER. For example, the allowable deviation TE may be set as 1 m, 3 m, 5 m, etc., from an outer periphery of the operation region TA. The allowable deviation range ER may be set as a region that is the operation region TA plus the allowable deviation TE. The controller 110 may control the flight location of the UAV 100, such that the actual spread region is within the allowable deviation range ER.

When there is a wind WD in the operation region TA, the spread object may displace in the horizontal direction due to the wind force while descending. For example, as shown in FIG. 14, the spread location of the spread object may deviate toward a downwind side based on the height. In the illustrated example, when a height to the spread target is H1, as compared to the no-wind state, the spread location has been displaced for a distance L2, and the deviation in the spread region is E2. At a height H1<H2, L1<L2, and E1<E2.

(A First Action Example for Controlling the Flight Location)

Next, the first action example for controlling the flight location will be described.

Figure 15:
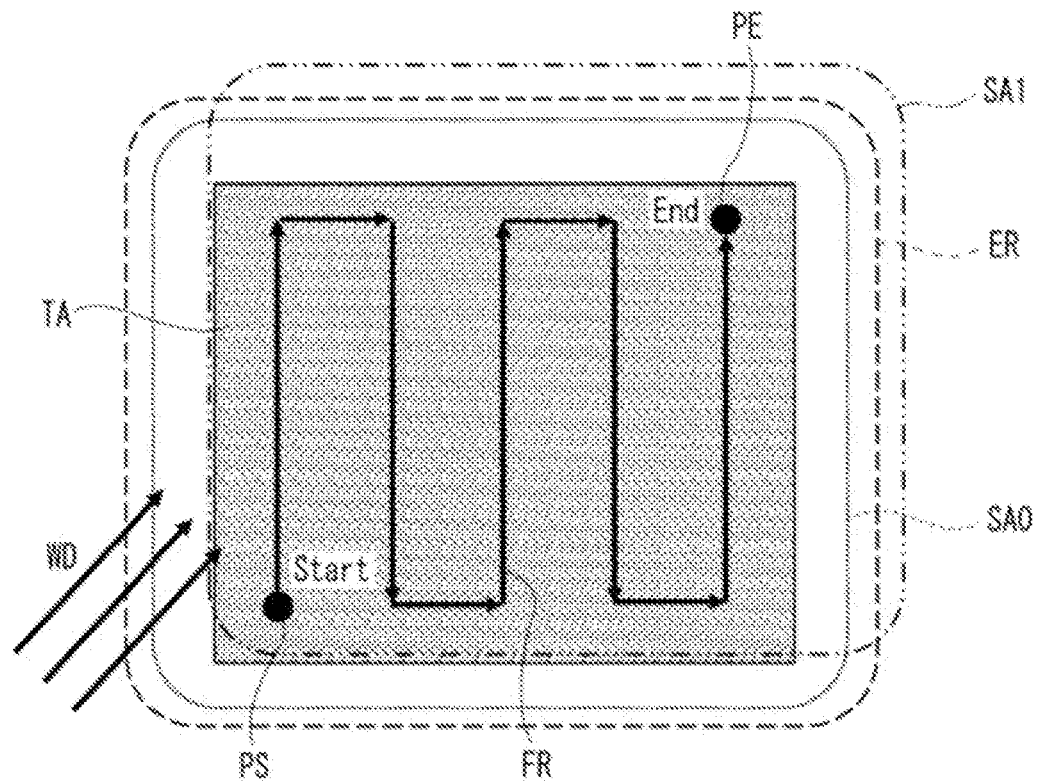
FIG. 15 is a schematic illustration of an operation region and a spread region of a spread operation in a first action example, according to an example embodiment.

FIG. 15 is a schematic illustration of an operation region and a spread region in a spread operation in the example of the first action example. The controller 110 may set the operation region TA, the operation starting location (initial location) PS, and the operation ending location (final location) PE of the spread operation based on instruction input by the user. The controller 110 may calculate and determine a flight path FR for performing the spread operation from the operation starting location PS to the operation ending location PE in the operation region TA. The controller 110 may set the allowable deviation range ER of the operation region TA based on instructions input by the user. In addition, the controller 110 may set the type of the spread object and the type of the nozzle used in the spread operation based on the instructions input by the user. The controller 110 may retrieve, from the memory 120 or the storage device 240, to obtain one or more deviation parameters corresponding to the combination of the selected nozzle for the spread object and the pesticide.

In a no-wind state in the operation region TA, the spread object may be spread in the spread region SA0, and may be within the allowable deviation range ER. Thus, the spread operation may be suitably executed. On the other hand, in a situation where there is a wind WD in the operation region TA, for example, the spread object may be spread toward a downwind direction in a deviating manner, as shown in the spread region SA1, which may have exceeded the allowable deviation range ER. As a result, the spread operation may not be suitably performed. Therefore, in the present disclosure, the flight height at which the spread operation is performed may be controlled based on the wind speed in the vicinity of the UAV 100, such that the spread region does not exceed the allowable deviation range ER.

The controller 110 may determine the wind speed and the wind direction in the vicinity of the UAV 100 based on the detection result of the wind speed and wind direction gauge 190, thereby obtaining the current instant wind speed information and the wind direction information, as the wind information. In addition, the controller 110 may obtain the wind information such as the current wind speed and wind direction from other measurement devices or apparatuses.

Figure 16:
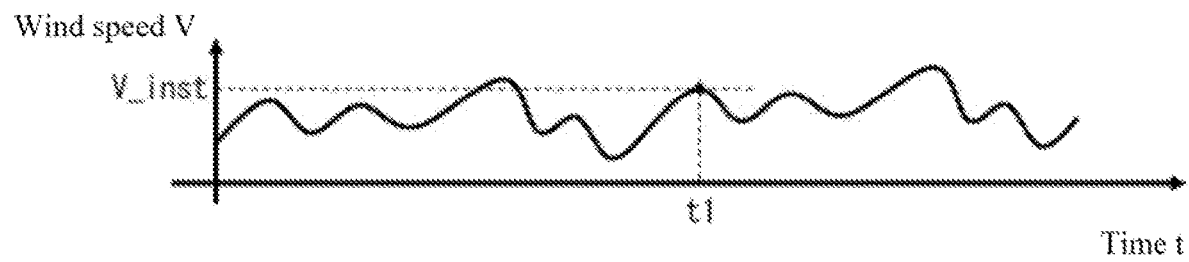
FIG. 16 is a schematic illustration of calculating an instant wind speed, which is an example of wind information, according to an example embodiment.

FIG. 16 is a schematic illustration of a process for obtaining the instant wind speed, which is an example of the wind information. The illustrated example shows the measurement result of changes in the wind speed V with respect to time, and show the acquisition of the instant wind speed V_inst at time t1. The instant wind speed V_inst may be calculated based on an average value of the wind speed in a short time period such as 5-10 seconds. The controller 110 may calculate the average value of the wind speeds in a 5-second period using time t1 as the center, or in a 5-second period immediately preceding time t1, to obtain the instant wind speed V_inst.

The controller 110 may determine the deviation E of the spread region of the spread object based on the current instant wind speed V_inst.

Figure 17:
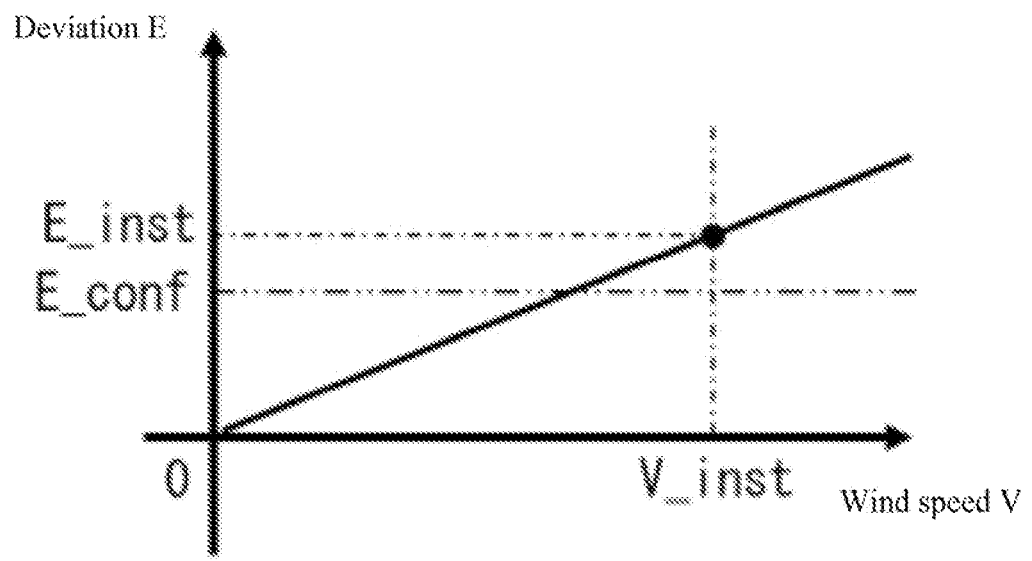
FIG. 17 is a schematic illustration of characteristics of deviation of the spread region corresponding to the wind speed, according to an example embodiment.
Figure 18:
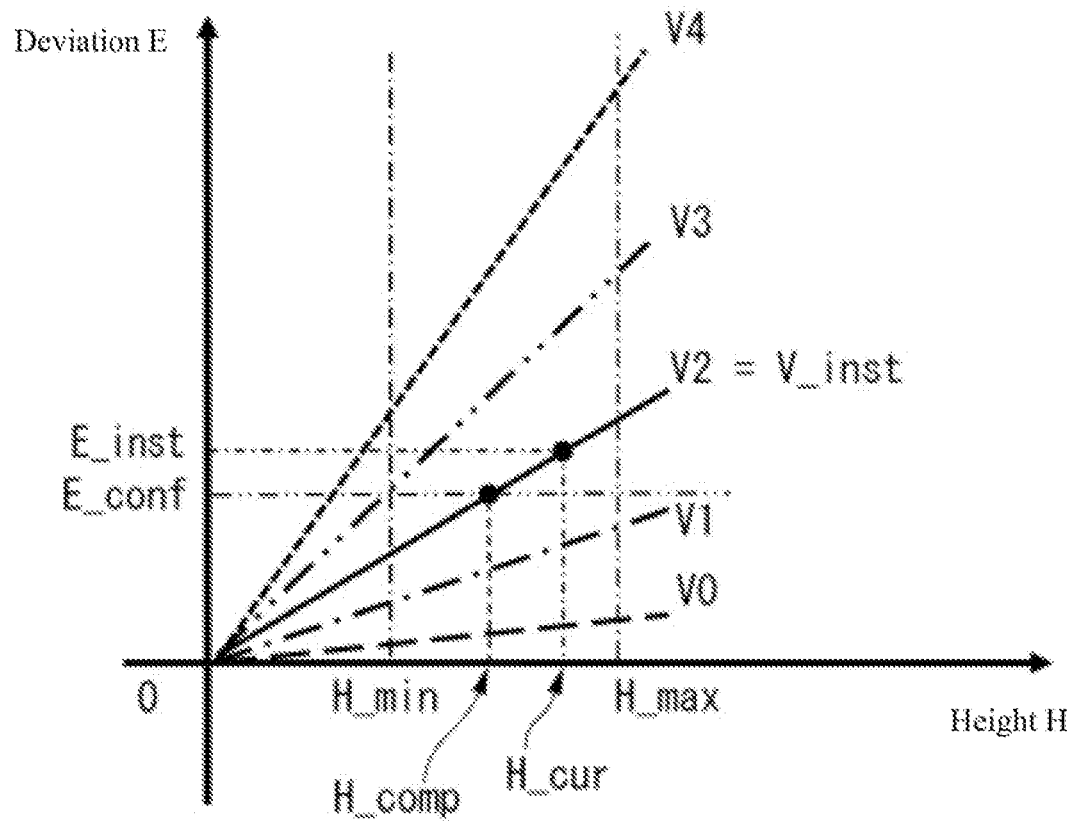
FIG. 18 is a schematic illustration of characteristics of deviations corresponding to heights at each wind speed, according to an example embodiment.

FIG. 17 is a schematic illustration of characteristics of the deviation E of the spread region with respect to the wind speed. FIG. 18 is a schematic illustration of the characteristics of the deviation E with respect to the height at each wind speed. The controller 110 may calculate a deviation value E_inst corresponding to the instant wind speed V_inst based on the deviation parameter shown in the characteristic plot in FIG. 17. Then, the controller 110 may determine whether the deviation value E_inst exceeds a maximum allowable deviation E_conf corresponding to a predetermined allowable deviation range ER, based on the deviation parameter shown in the characteristic plot in FIG. 18. That is, the controller 110 may determine whether, under the current instant wind speed V_inst, the spread operation within the allowable deviation range ER can be performed at the current height H_cur. This example is an example in which when the maximum allowable deviation for the spread operation is set as E_max, E_max=E_conf. When the deviation value E_inst corresponding to the instant wind speed V_inst exceeds the allowable deviation range ER, the controller 110 may adjust the height of the UAV 100, to reduce the height such that the deviation value E_inst is within the allowable deviation range ER.

Here, FIG. 18 shows the deviation parameter P1 corresponding to the combination of pesticide I and nozzle B. For example, when the instant wind speed is V_inst=V2, if at the current height H_cur, E_inst>E_conf, then the controller 110 may calculate and set, based on the deviation parameter P1, a height adjustment value H_comp that is a height reduced from the current height H_cur, such that the deviation E of the spread region decreases to below the maximum allowable deviation E_conf. In addition, the controller 110 may reduce the height of the UAV 100 from the current height H_cur to the height adjustment value H_comp. In FIG. 18, H_max, H_min indicate the range of height limitation in the spread operation. H_max represents the largest height, H_min represents the smallest height.

Figure 19:
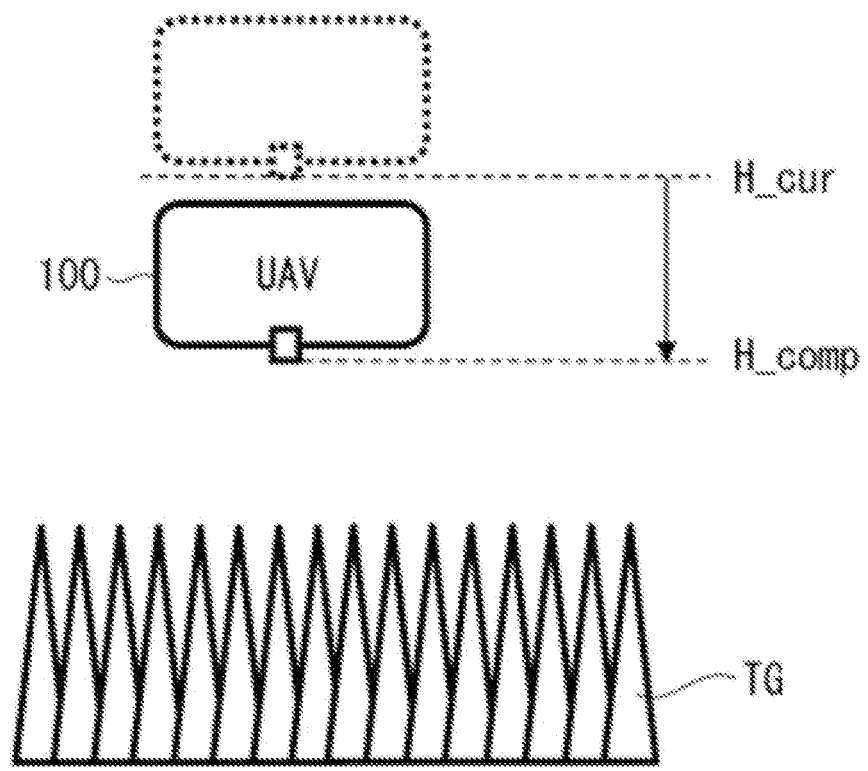
FIG. 19 is a schematic illustration of flight control in a first action example, according to an example embodiment.

FIG. 19 is a schematic illustration of flight control in the first action example. At the current height H_cur, when the deviation value E_inst calculated based on the instant wind speed V_inst exceeds the maximum allowable deviation E_conf, the controller 110 may adjust the height to the height adjustment value H_comp such that E_inst≤E_conf, i.e., performs the control to reduce the height of the UAV 100. As such, even when there is a wind in the operation region, for spread target TG, the spread object may still be spread within an allowable deviation range, thereby suitably performing the spread operation desired by the user.

Figure 20:
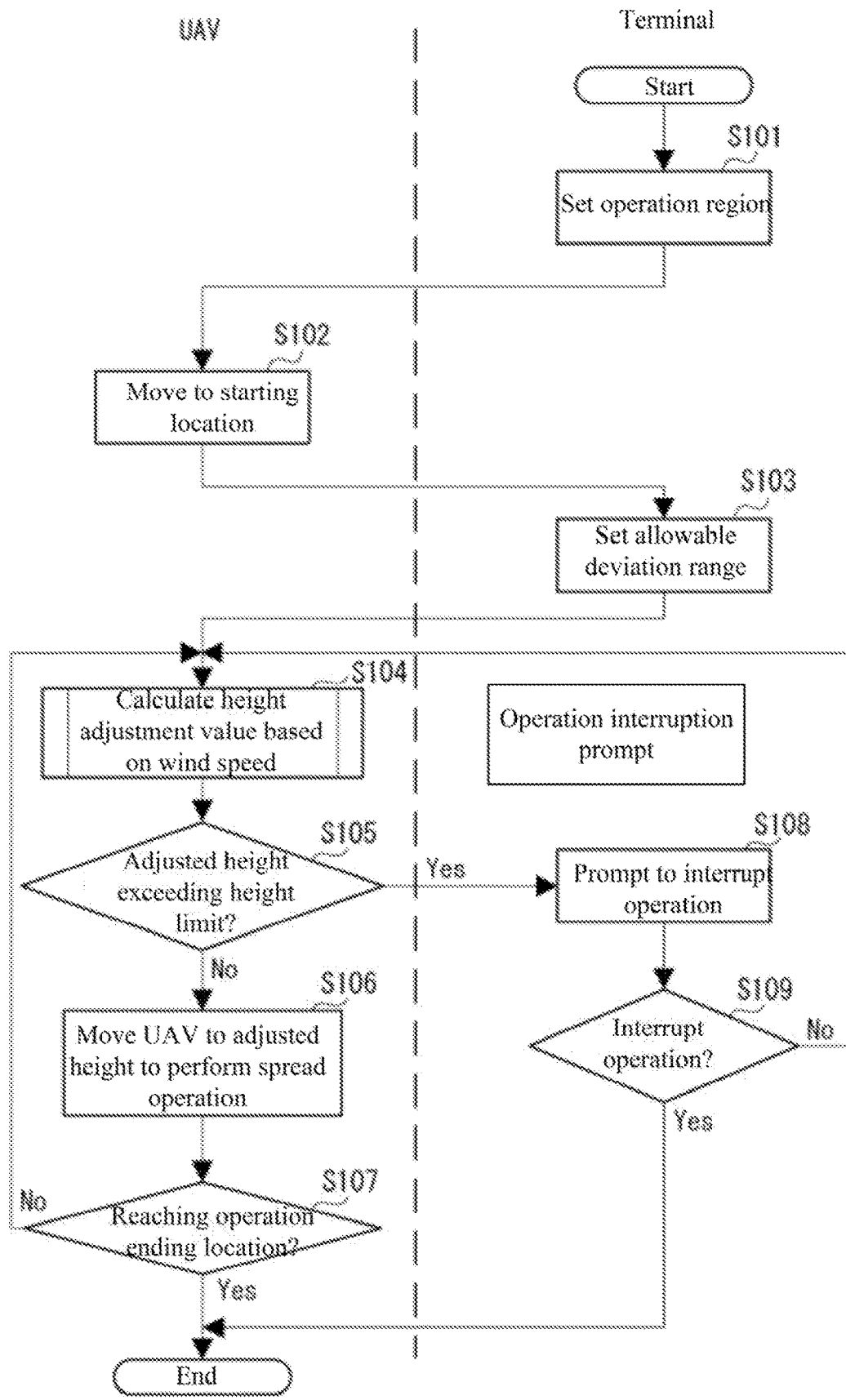
FIG. 20 is a flow chart illustrating processes of a spread operation in a first action example, according to an example embodiment.
Figure 21:
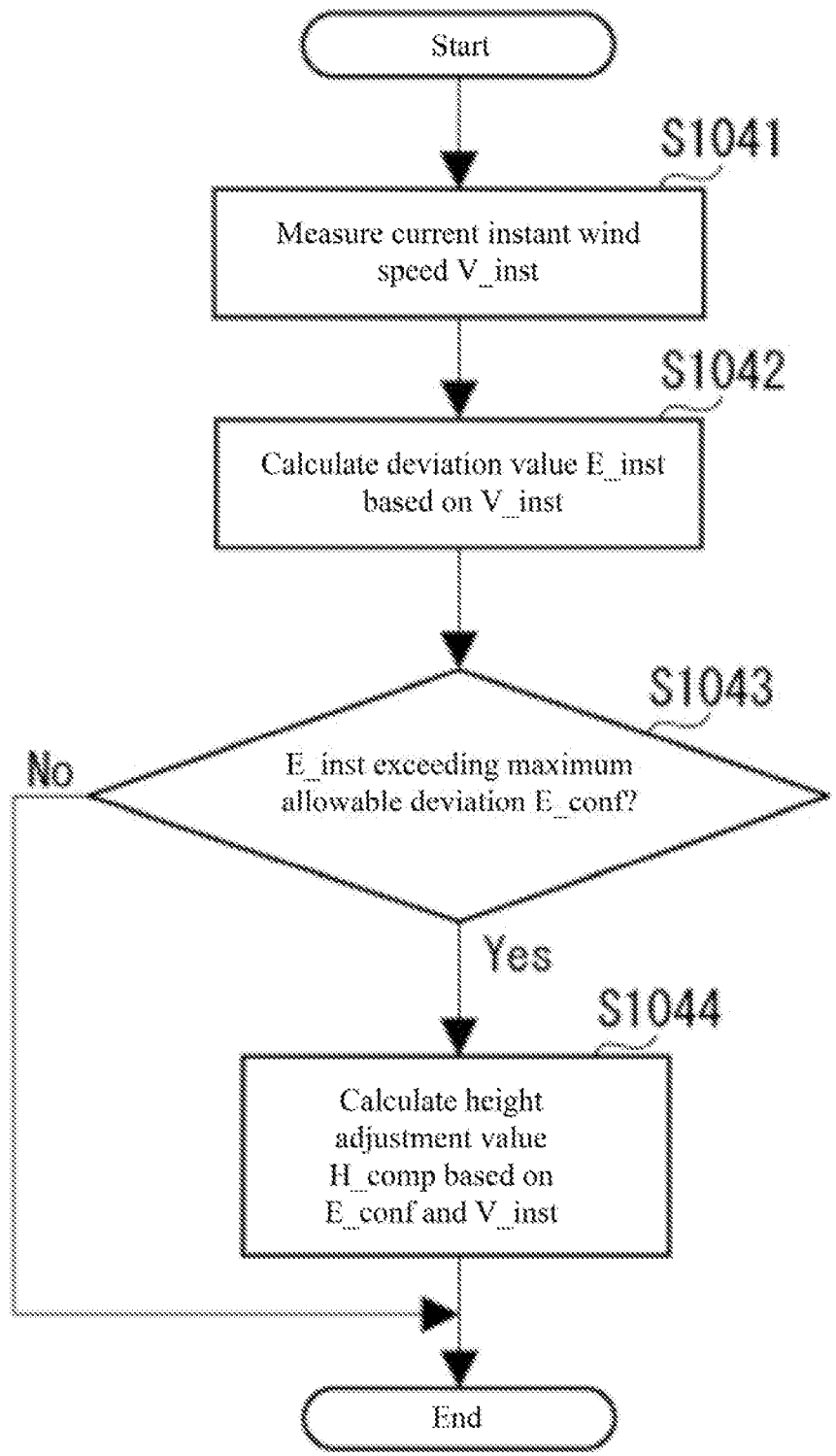
FIG. 21 is a flow chart illustrating processes of adjusting height in the first action example, according to an example embodiment.
Figure 22:
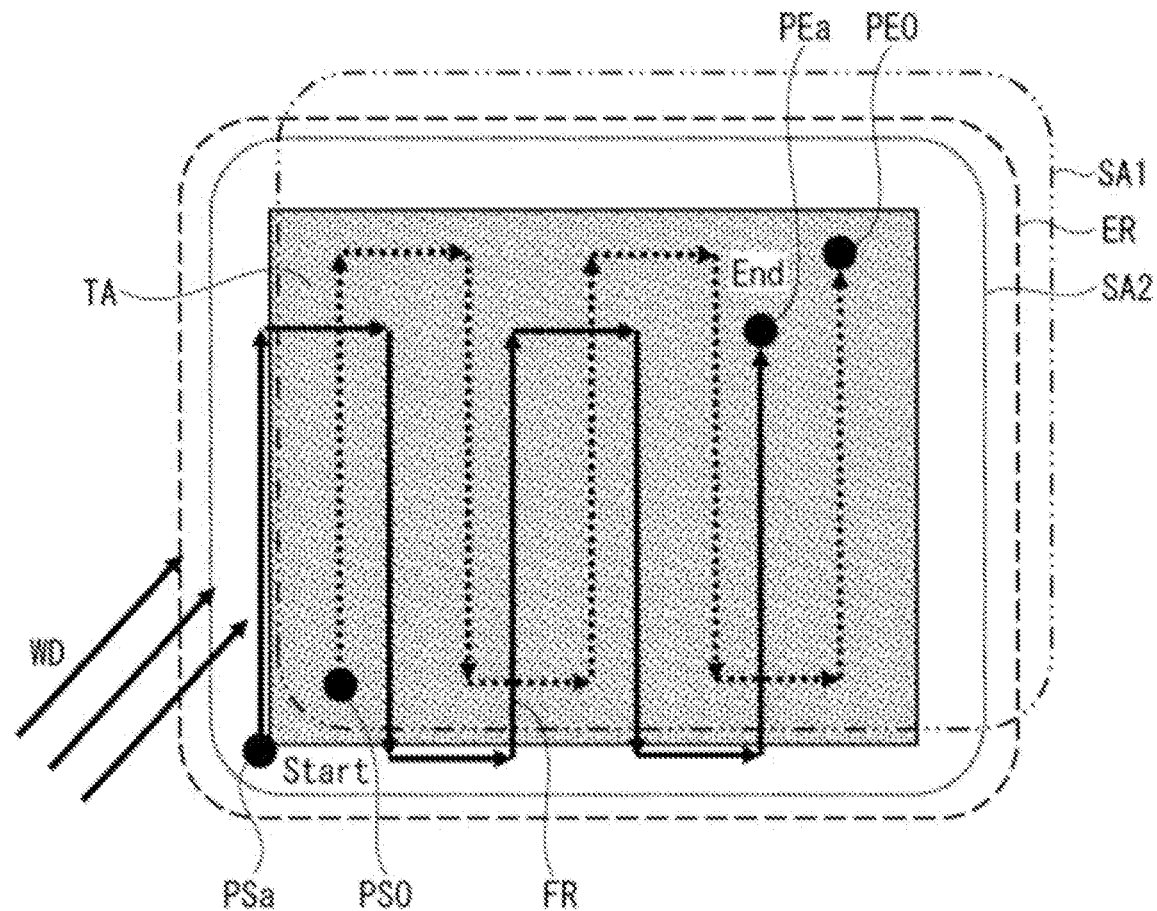
FIG. 22 is a schematic illustration of an operation region and a spread region of a spread operation in a second action, according to an example embodiment.

FIG. 20 is an example flow chart illustrating the processing orders of the spread operation in the first action example. FIG. 21 is an example flow chart illustrating the processing order related to the height adjustment in the first action example.

When performing the spread operation, the processing device 51 of the terminal 50 may receive an operation input from the user for specifying the operation region, and may transmit the information of the operation region TA to the UAV 100 to set the operation region TA of the UAV 100 (S101). The controller 110 of the UAV 100 may control the UVA 100 to fly and move to the operation starting location (initial location) PS based on the setting information of the operation region TA (S102). The processing device 51 of the terminal 50 may receive an operation input from the user specifying the allowable deviation range, and may transmit information of the allowable deviation range ER to the UAV 100, to set the allowable deviation range ER in the operation region TA (S103). The allowable deviation range ER may include the maximum allowable deviation E_conf.

The controller 110 of the UAV 100 may obtain the current wind information, and may execute the processing of calculating the height adjustment value based on the wind speed (S104). During the processing of calculating the height adjustment value, the controller 110 may determine the current instant wind speed V_inst based on the output result of the wind speed and wind direction gauge 190 (S1041). Next, the controller 110 may calculate the deviation value E_inst based on the instant wind speed V_inst (S1042). Then, the controller 110 may determine whether the deviation value E_inst exceeds the maximum allowable deviation E_conf (S1043). As such, the controller 110 may determine whether the spread operation within the allowable deviation range ER can be performed at the current height H_cur. When the deviation value E_inst does not exceed the maximum allowable deviation E_conf (S1043: No), the controller 110 may terminate the processing of calculating the height adjustment value, and may maintain the current height H_cur. On the other hand, when the deviation value E_inst exceeds the maximum allowable deviation E_conf (S1043: Yes), the controller 110 may calculate and set the height adjustment value H_comp based on the deviation parameter, the maximum allowable deviation E_conf, and the instant wind speed V_inst (S1044).

The controller 110 may determine, based on the set height adjustment value H_comp, whether the adjusted height (H_comp) exceeds the height limitation (S105). For example, the controller 110 may determine whether the height adjustment value H_comp exceeds the maximum height H_max or the minimum height H_min. When the adjusted does not exceed the height limitation (S105: No), the controller 110 may move, based on the set height adjustment value H_comp, the UAV 100 to the adjusted height (H_comp), and to execute the spread operation (S106). At this moment, the controller 110 reduces the current height H_cur of the UAV 100 to the height adjustment value H_comp. When reducing the height of the UAV 100, the controller 110 may reduce a spread amount in a unit time period, such that the spread amount corresponds to the height. The spread amount of the spread object may be suitably determined based on the height. For example, the spread amount may change linearly with respect to the height, such that the spread amount is larger when the height is higher, and the spread amount is smaller when the height is lower. In addition, when the deviation value E_inst that is based on the instant wind speed V_inst does not exceed the maximum allowable deviation E_conf, the current height H_cur may be maintained, and the height adjustment value H_comp=H_cur.

In addition, when at the current height H_cur, the deviation value E_inst based on the instant wind speed V_inst is below the maximum allowable deviation E_conf, the controller 110 may perform controls to increase the height within the maximum height H_max. In addition, when the current height H_cur is below the maximum height H_max, and the deviation value E_inst is within the maximum allowable deviation E_conf, the controller 110 may control the height to increase the height as much as possible. When the current height H_cur is below the maximum height H_max, and when the height can be increased, the controller 110 may increase the height of the UAV 100, increase the spread amount of the unit time period, such that the spread amount corresponds to the height.

In addition, the controller 110 may regularly obtain the instant wind speed V_inst at a predetermined time interval during the flight in the spread operation. The controller 110 may regularly adjust the height of the UAV 100 at a predetermined time interval when the deviation value E_inst does not exceed the maximum allowable deviation E_conf. At this time, the UAV 100 performs the spread operation while changing the height based on the current wind speed.

In addition, the controller 110 may determine, while performing the spread operation, whether an operation ending location (final location) PE has been reached (S107). When the operation ending location PE has not been reached (S107: No), the controller 110 may return to step S104 to process the computing of the height adjustment value, and repeat steps S104 to S107. When the operation ending location PE has been reached (S107: Yes), the controller 110 may terminate the spread operation, and control the UAV 100 to move to the flight ending location.

When the adjusted height exceeds the height limitation (S105: Yes), the controller 110 may transmit an operation interruption prompt instruction to the terminal 50. The processing device 51 of the terminal 50 may display, on the display device 54, an inquiry relating to the operation interruption based on the operation interruption prompt instruction, to prompt the user to interrupt the operation (S108). Then, the processing device 51 may receive an operation input from the user that instruct the UAV 100 to interrupt the operation, and may determine whether the spread operation is to be interrupted (S109). When receiving the operation interruption instruction from the terminal 50 but when it is determined not to interrupt the spread operation (S109: No), the controller 110 may return to step S104 to process the computing of the height adjustment value, and may repeat the steps S104 to S107. On the other hand, when interrupting the spread operation (S109: Yes), the controller 110 may interrupt the spread operation based on the operation interruption instruction from the terminal 50, and may control the UAV 100 to move to the flight ending location.

In addition, the controller 110 may obtain wind direction information, in addition to the wind speed information, and may adjust the height of the aircraft based on the wind speed and the wind direction.

In the above first action example, the wind speed information may be obtained and used as the wind information of the operation region when performing the spread operation. When the deviation of the spread region corresponding to the wind speed exceeds the maximum allowable deviation, a control may be performed to reduce the height of the aircraft. As such, in this example, the height may be adjusted based on the wind speed in the operation region, thereby adjusting the spread region, and reducing the effect of the wind. Therefore, the deviation of the spread region under the current wind speed can be controlled within the maximum allowable deviation range to perform a suitable spread operation. In addition, by reducing the spread amount while reducing the height, the spread amount is adjusted based on the height, which can realize high-efficiency spread. In addition, the deviation of the spread region is within the maximum allowable deviation range, and in feasible situations, the spread amount may be increased through controlling the increase of the height, thereby increasing the operation efficiency. As stated above, based on this embodiment, suitable and high-efficiency spread can be performed.

(Second Action Example of the Flight Location Control)

Next, the second action example of the flight location control will be described. In addition, for the same processes as those in the first action example, descriptions are omitted. The focus of the descriptions is on the processes different from those in the first action example.

FIG. 22 schematically illustrates an example showing the operation region of the spread operation and the spread region in the second action example. As in the first action example, the controller 110 may set the operation region TA of the spread operation, the operation starting location (initial location) PS, the operation ending location (final location) PE, the flight path FR, the allowable deviation range ER, the type of the spread object and the type of the nozzle, and the deviation parameter corresponding to the combination of the nozzle for the spread object and the pesticide.

When there is a wind WD in the operation region TA, for example, the spread object may be spread in a deviating manner to the downwind direction, as shown in the spread region SA1, which may exceed the allowable deviation range ER. As a result, a suitable spread operation may not be accomplished. Therefore, in this embodiment, the operation starting location PS and the operation ending location PE may be moved based on the wind speed in the vicinity of the UAV 100. In addition, through the control of the flight location, the spread region is controlled to not exceed the allowable deviation range ER. In the illustrated example, the operation starting location may be moved from PS0 to PSa, and the operation ending location may be moved from PE0 to PEa. The flight location may be moved to the upwind direction. The flight path FR may be calculated. The spread operation may be performed based on the new flight path FR. At this time, the spread object may be spread to a location that has been moved in the upwind direction, as shown in the spread region SA2, which is within the allowable deviation range ER. As a result, a suitable spread operation may be performed.

The controller 110 may determine, based on the detection result of the wind speed and wind direction gauge 190, the wind speed and wind direction in the vicinity of the UAV 100, and may obtain average wind speed information and average wind direction information within a predetermined time period, which are used as the wind information. In addition, the controller 110 may obtain the wind information, such as the average wind speed and wind direction within the predetermined time period from other measurement device and apparatus.

Figure 23:
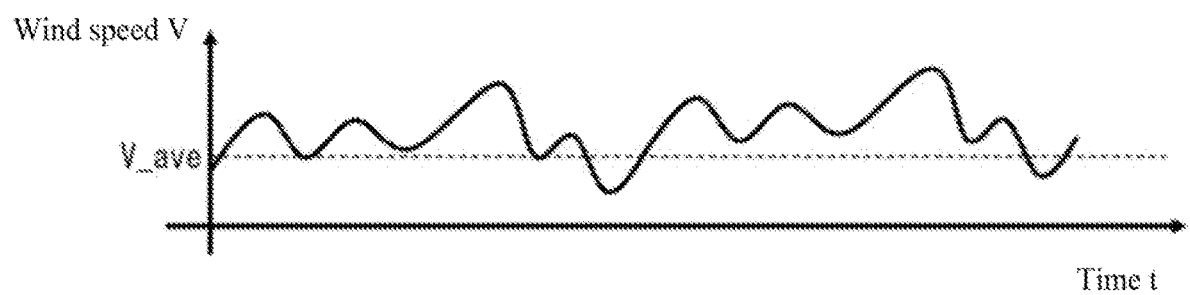
FIG. 23 is a schematic illustration of calculating an average wind speed, which is an example of the wind information, according to an example embodiment.

FIG. 23 schematically illustrates the processing for calculating the average wind speed, which is an example of the wind information. The illustrated example shows a measurement result of the wind speed V that changes as the time elapses, and that the average wind speed V_ave in the predetermined time period is obtained. The average wind speed V_ave may be calculated by obtaining the average value of the wind speed in a 1-5-minute time period. Alternatively, the average wind speed V_ave may be calculated by obtaining the average value of the wind speed in the time period in which the spread operation is performed from the operation starting location to the operation ending location. The controller 110 may calculate the average value of the wind speed within the time period 5 minutes immediately preceding the current time instance, to obtain the average wind speed V_ave. In addition, the controller 110 may calculate the average wind direction A_ave together with the average wind speed V_ave in the predetermined time period.

Figure 24:
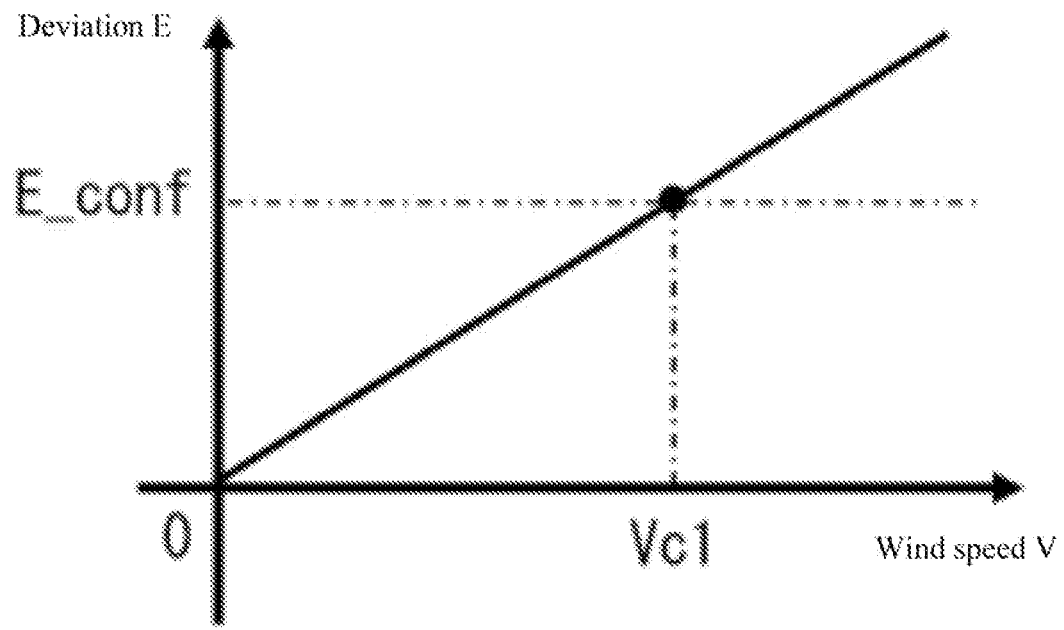
FIG. 24 is a schematic illustration of characteristics of deviations of a spread region corresponding to the wind speed, according to an example embodiment.
Figure 25:
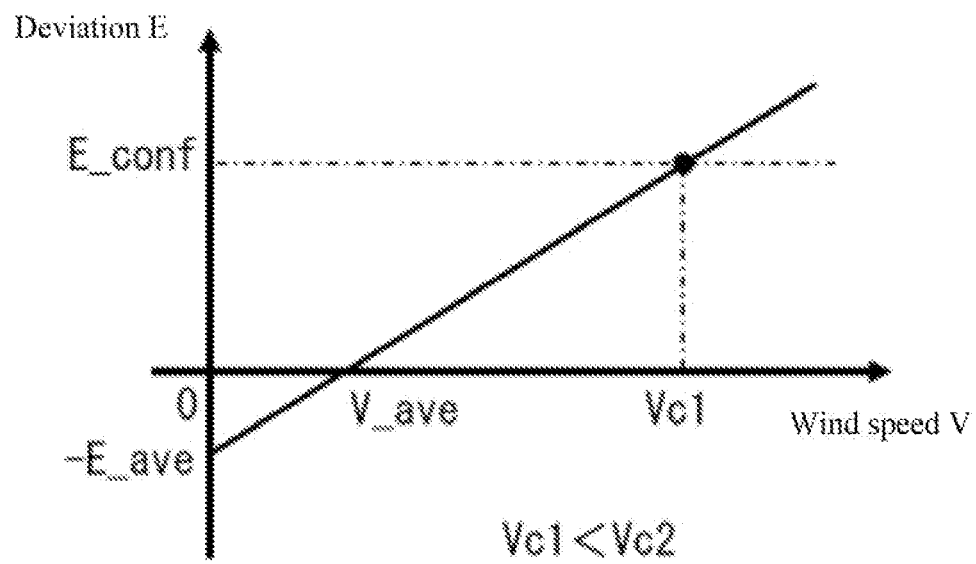
FIG. 25 is a schematic illustration of characteristics of deviations of a spread region corresponding to the wind speed when the deviation at an average wind speed is translated to be zero, according to an example embodiment.

FIG. 24 schematically illustrates characteristics of a deviation E of the spread region corresponding to the wind speed V. As shown in the deviation parameter in FIG. 24, the deviation E corresponding to the wind speed Vc1 may be set correspond to the maximum allowable deviation E_conf in a predetermined allowable deviation range ER. Here, when the deviation corresponding to the average wind speed V_ave is translated to be zero (E=0), the characteristics of the deviation E in the spread region become that shown in FIG. 25, in which the deviation E corresponding to the wind speed Vc2 becomes the maximum allowable deviation E_conf. At this moment, Vc1<Vc2, and the wind speed corresponding to the maximum allowable deviation E_conf increases, which allows for a deviation of the spread region corresponding to a larger wind speed before the operation starting location is translated. Here, if the deviation caused by the wind effect when the average wind speed is V_ave is E_ave, then the deviation corresponding to zero wind speed V=0 after the zero translation becomes −E_ave. The deviation E in the spread region may be translated by moving the spread location.

Figure 26:
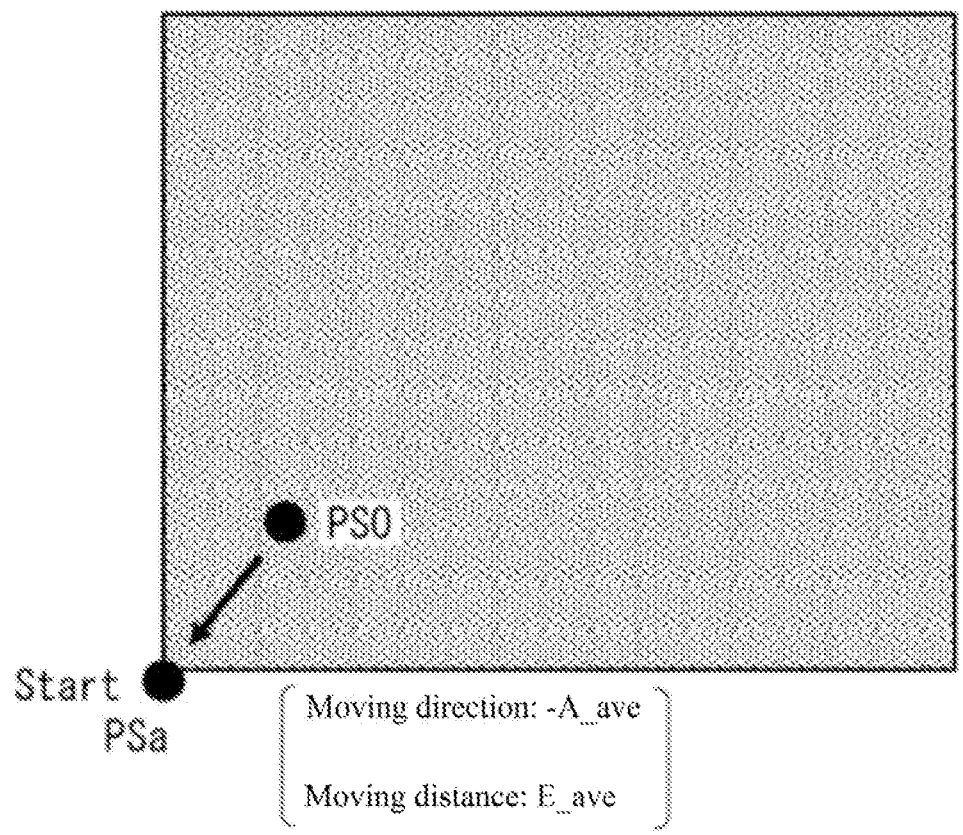
FIG. 26 is a schematic illustration of movement of an operation starting location corresponding to the average wind speed, according to an example embodiment.
Figure 27:
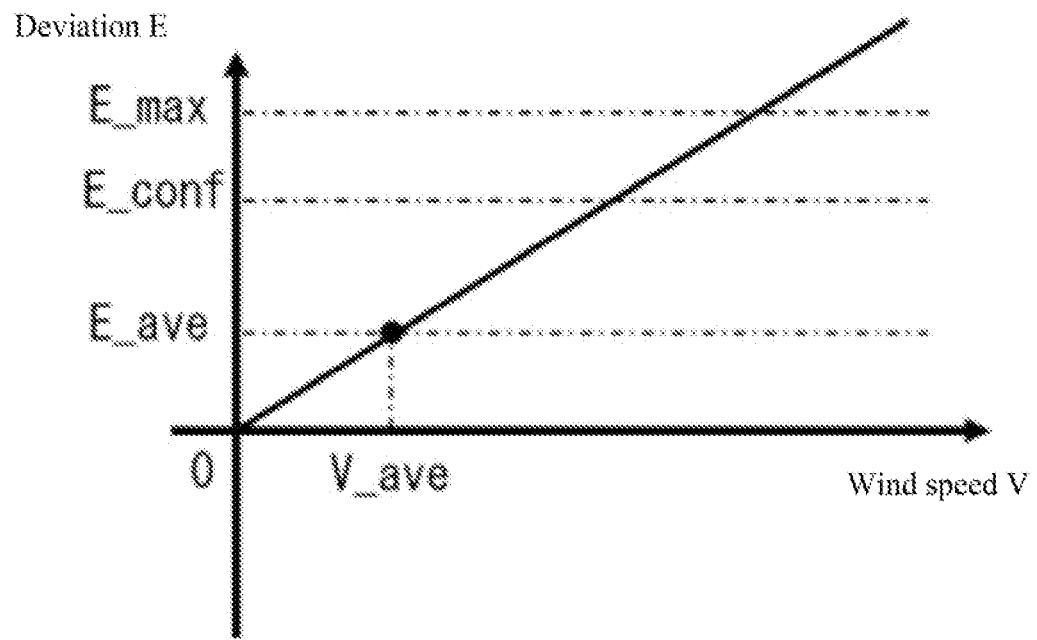
FIG. 27 is a schematic illustration of characteristics of deviations of the spread region corresponding to the wind speed after the operation starting location has been translated, according to an example embodiment.

FIG. 26 schematically illustrates movement of the operation starting location corresponding to the average wind speed V_ave. FIG. 27 schematically illustrates characteristics of the deviation E of the spread region corresponding to the wind speed V after the operation starting location has been moved. As shown in FIG. 26, if the moving direction is −A_ave, the moving distance is E_ave, the controller 110 may offset the deviation E corresponding to the average wind speed V_ave and the average wind direction A_ave through moving the operation starting location in a direction opposite the wind direction from PS0 to PSa, such that E=0. Along with the movement of the operation starting location, as shown by the deviation parameter in FIG. 27, in the characteristics of the deviation E of the spread region corresponding to the wind speed V, the controller 110 may set the maximum allowable deviation corresponding to the allowable deviation range ER as E_max. Then, E_max=E_conf+E_ave. In addition, in order for the deviation E when the wind speed becomes 0 does not exceed the allowable deviation range ER, the controller 110 may control the movement of the operation starting location within the range of E_ave≤E_max.

Next, the control of the flight location after the operation starting location is moved in the second action example will be explained. As in the first action example, the controller 110 may obtain the current instant wind speed V_inst, calculate the deviation value E_inst corresponding to the instant wind speed V_inst, and determine the deviation E of the spread region of the spread object.

Figure 28:
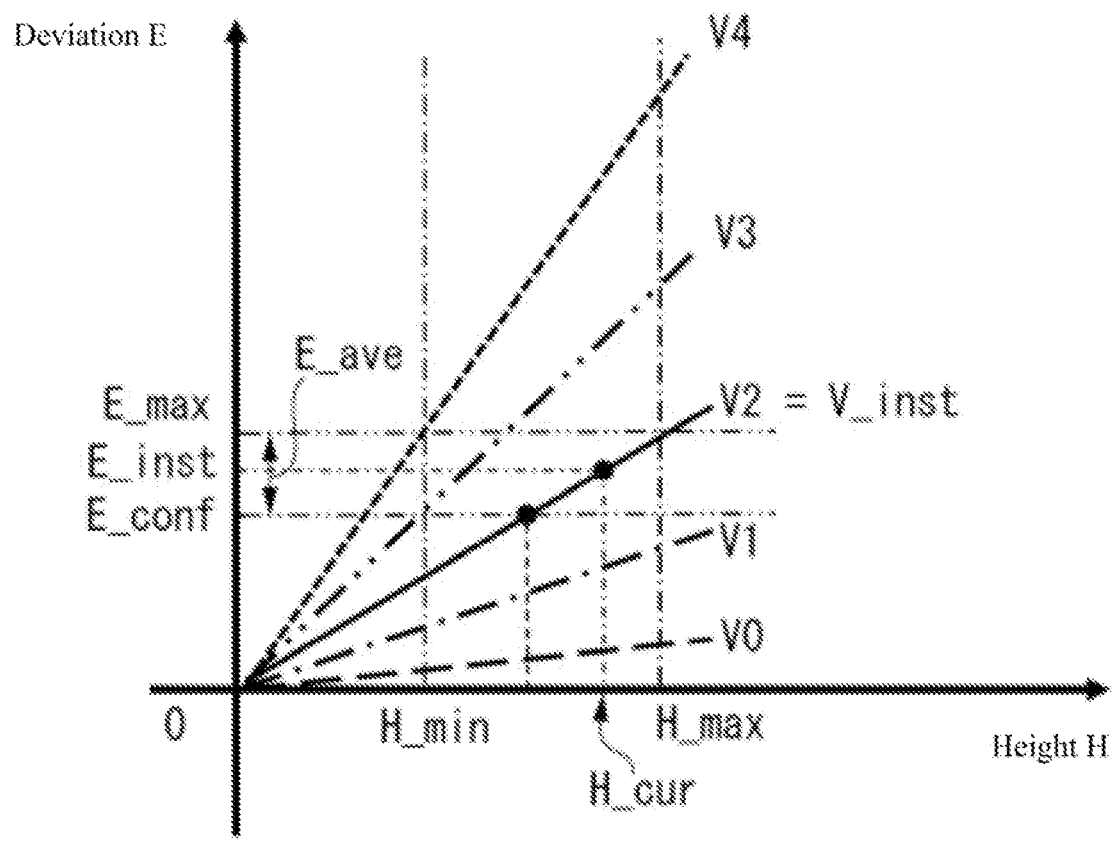
FIG. 28 is a schematic illustration of characteristics of deviations corresponding to the height for each wind speed after the operation starting location has been translated, according to an example embodiment.

FIG. 28 schematically illustrates the characteristics of the deviation E corresponding to height H at each wind speed after the operation starting location has been moved. The controller 110 may determine, based on the deviation parameter shown in the characteristics plot of FIG. 28, whether the deviation value E_inst exceeds the maximum allowable deviation E_max corresponding to the predetermined allowable deviation range ER. Here, FIG. 28 shows the deviation parameter P1 corresponding to the combination of pesticide I and the nozzle B. The controller 110 may determine, based on the deviation parameter P1, whether the current height H_cur at the instant wind speed V_inst=V2 satisfies E_inst≤E_max.

The illustrated example shows the state in which the deviation value E_inst caused by the wind speed V_inst exceeds the maximum allowable deviation E_conf prior to the movement of the operation starting location, but does not exceed the maximum allowable deviation E_max after the movement of the operation starting location. The controller 110 may not perform the height adjustment, but instead, may maintain the current height H_cur. In addition, when the deviation value E_inst exceeds the maximum allowable deviation E_max, i.e., when E_inst>E_max, as in the first action example, the controller 110 may reduce the height of the UAV 100 from the current height H_cur to the height adjustment value H_comp, such that the deviation E of the spread region becomes below the maximum allowable deviation E_max.

Figure 29:
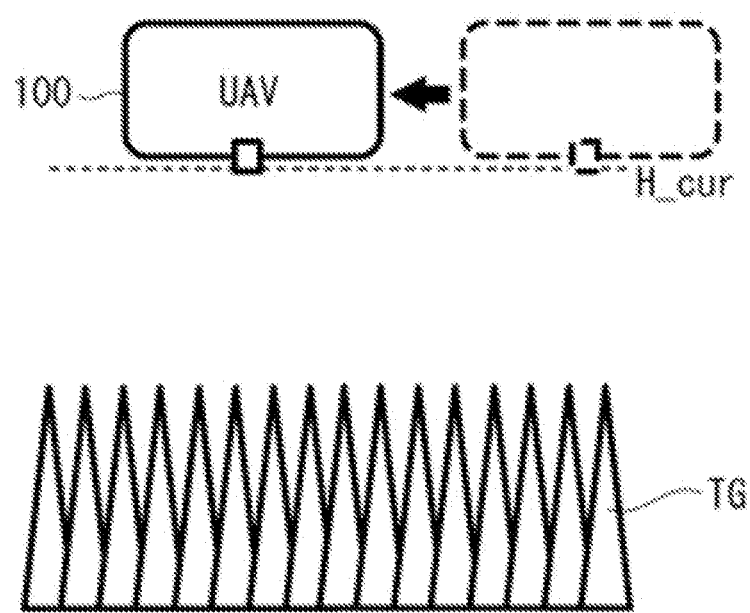
FIG. 29 is a schematic illustration of flight control in a second action, according to an example embodiment.

FIG. 29 is a schematic illustration of the flight control in the second action example. The controller 110 may obtain the average wind speed V_ave and the average wind direction A_ave within a predetermined time period, and may control the movement of the operation starting location based on the average wind speed V_ave and the average wind direction A_ave. As such, even when there is a wind in the operation region, while the current height H_cur is maintained unchanged, the spread object may be spread, relative to the spread target TG, within the allowable deviation range, thereby suitably executing the spread operation expected by the user.

Figure 30:
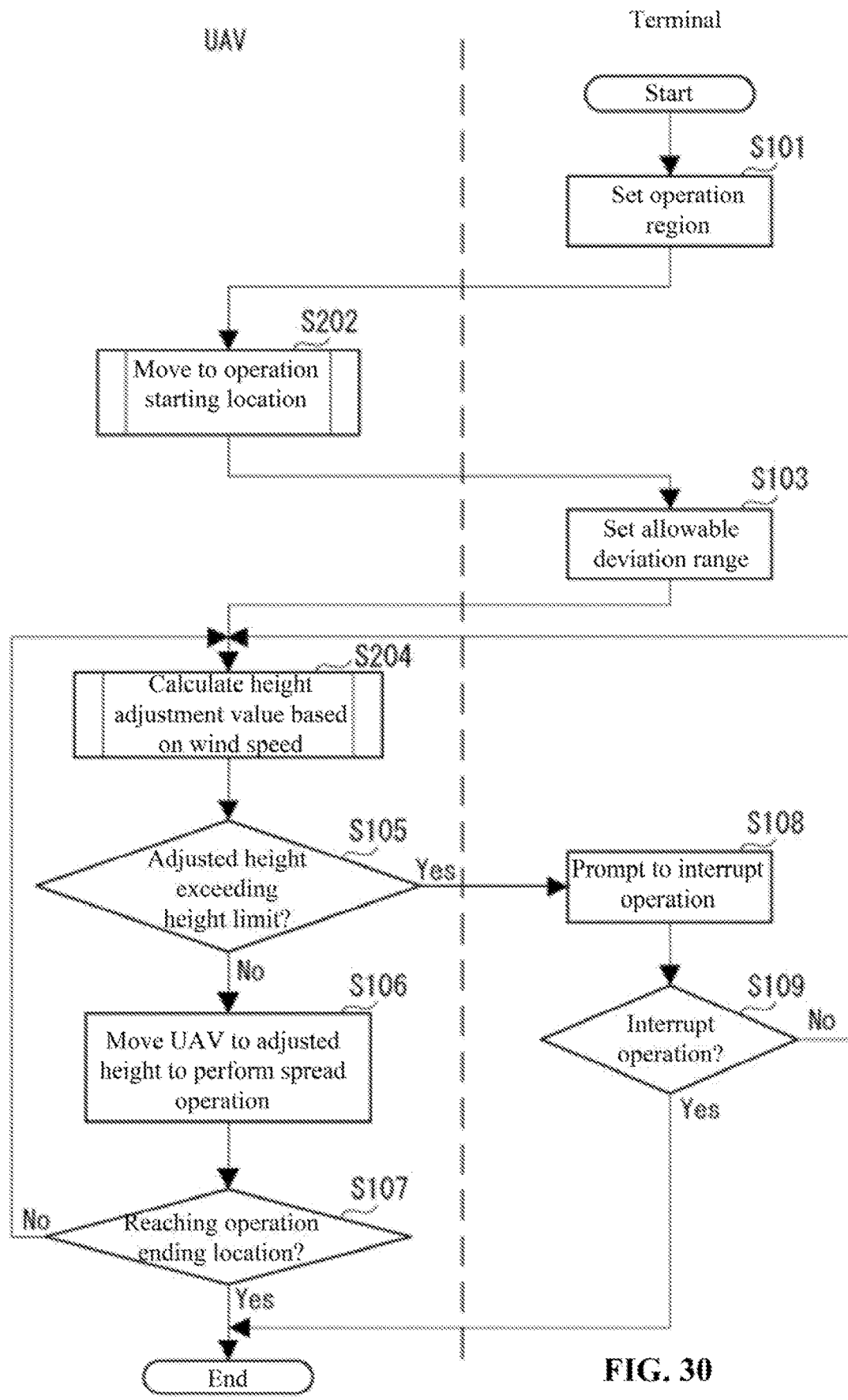
FIG. 30 is a flow chart illustrating processes of a spread operation in a second action, according to an example embodiment.
Figure 31:
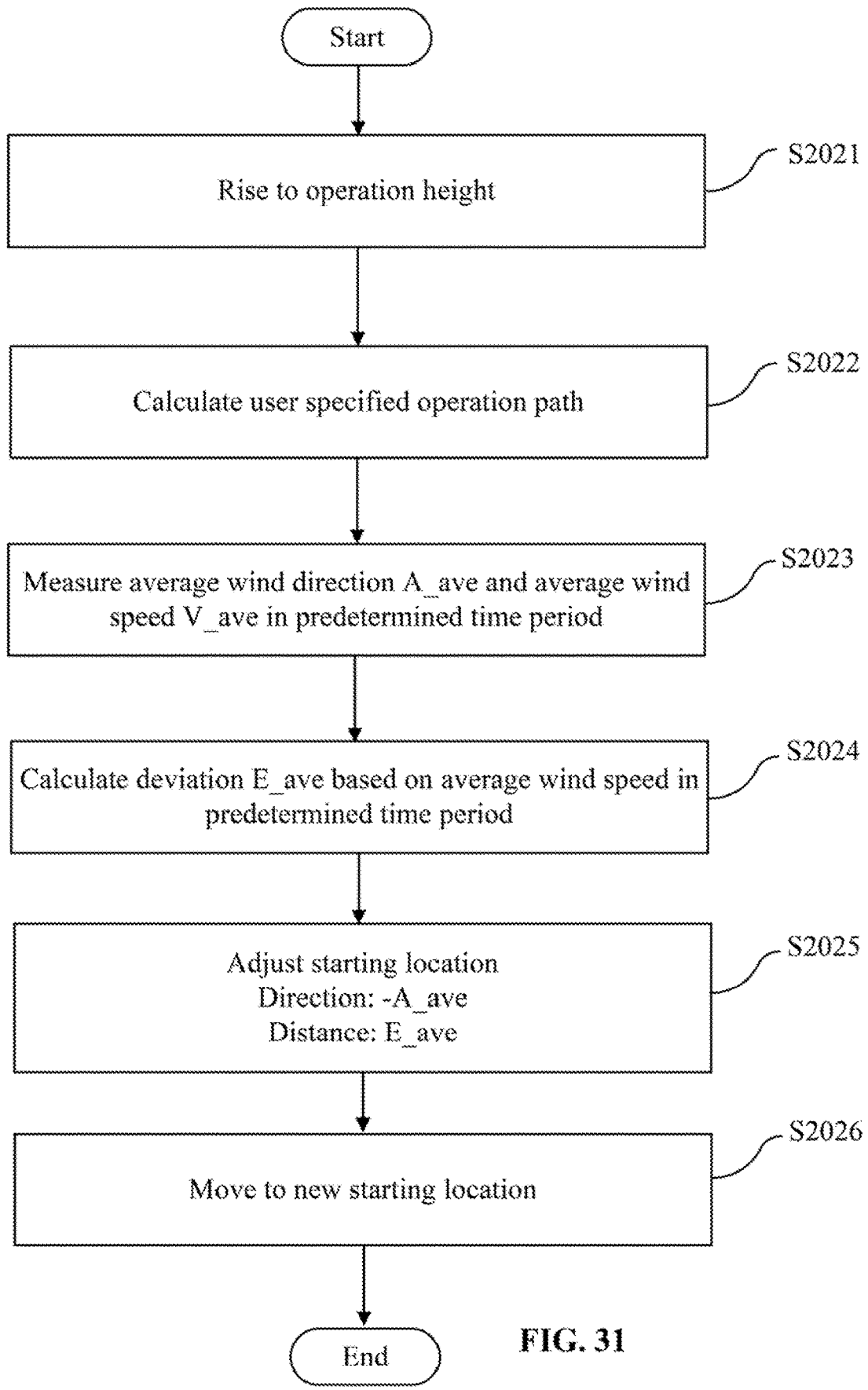
FIG. 31 is a flow chart illustrating processes relating to movement of the operation starting location in the second action, according to an example embodiment.
Figure 32:
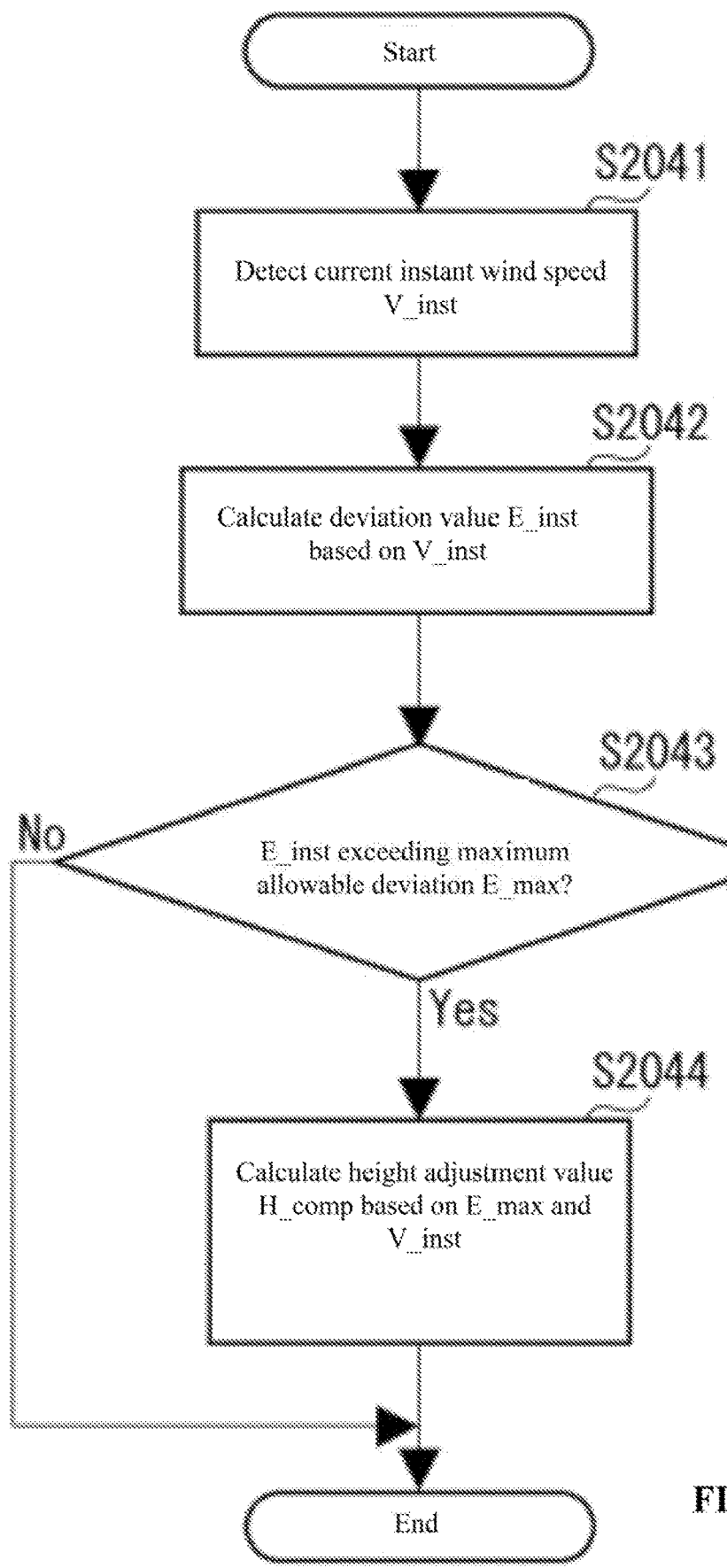
FIG. 32 is a flow chart illustrating processes of adjusting the height in the second action, according to an example embodiment.

FIG. 30 is an example flow chart illustrating processing orders of the spread operation in the second action example. FIG. 31 is an example flow chart illustrating the processing orders relating to the movement of the operation starting location in the second action example. FIG. 32 is an example flow chart illustrating the processing orders relating to the height adjustment in the second action example. In FIG. 30, the same labels are assigned to the same orders as in the first action example.

When the spread operation is performed, the processing device 51 of the terminal 50 may receive an operation input from the user for specifying the operation region, and may transmit the information of the operation region TA to the UAV 100, to set the operation region TA of the UAV 100 (S101). The controller 110 of the UAV 100 may control the UAV 100 to fly and move to the operation starting location (initial location) based on the setting information of the operation region TA (S202). In the processing of moving the operation starting location, the controller 110 may control the UAV 100 to rise to an operation height (S2021). Thereafter, the controller 110 may calculate the flight path FR that is suitable for the specified operation region TA, as the operation path specified by the user (S2022).

In addition, the controller 110 may determine the average wind speed V_ave and the average wind direction A_ave based on the output result of the wind speed and wind direction gauge 190 (S2023). Next, the controller 110 may calculate the deviation value E_ave based on the average wind speed V_ave in the predetermined time period (S2024). Then, the moving direction may be set as –A_ave, the moving distance may be E_ave, the controller 110 may move the operation starting location from PS0 to PSa while maintaining the height of the UAV 100, thereby adjusting the starting location of the spread operation (S2025). Thereafter, the controller 110 may control the UAV 100 to move to the new operation starting location (initial location) PSa (S2026).

Next, the processing device 51 of the terminal 50 may receive an operation input from the user specifying the allowable deviation range, and may transmit information of the allowable deviation range ER to the UAV 100, to set the allowable deviation range ER in the operation region TA (S103). The allowable deviation range ER may include the maximum allowable deviation E_max after the operation starting location is moved.

The controller 110 of the UAV 100 may obtain the current wind information, and may execute the processing of calculating the height adjustment value based on the wind speed (S204). In the process of computing the height adjustment value, the controller 110 may determine the current instant wind speed V_inst (S2041), calculate the deviation value E_inst based on the instant wind speed V_inst (S2042), and determine whether the deviation value E_inst exceeds the maximum allowable deviation E_max (S2043). As such, the controller 110 may determine whether the spread operation in the allowable deviation range ER can be performed at the current height H_cur. When the deviation value E_inst does not exceed the maximum allowable deviation E_max (S2043: No), the controller 110 may end the computing process of the height adjustment value, and may maintain the current height H_cur. On the other hand, when the deviation value E_inst exceeds the maximum allowable deviation E_max (S2043: Yes), the controller 110 may calculate and set the height adjustment value H_comp based on the deviation parameter, the maximum allowable deviation E_max, and the instant wind speed V_inst (S2044).

The processes relating to the height adjustment in the spread operation may be the same as those in the first action example. The controller 110 may execute steps S105 to S109, and may adjust the height based on the instant wind speed V_inst. The controller 110 may perform the spread operation until flies through the flight path ER and arrive at the operation ending location Pea. When arriving at the operation ending location Pea (S107: Yes), the controller 110 may end the spread operation processing, and may control the UAV 100 to move to the flight ending location.

In addition, the controller 110 may obtain only the wind direction information, and may adjust the operation starting location within a predetermined range based on the wind direction. In addition, when in the range not exceeding the maximum allowable deviation E_conf or E_max, the controller 110 may perform controls to increase the height of the aircraft in a range below the maximum height H_max.

In the above second action example, the wind speed information and the wind direction information may be obtained as the wind information for the operation region when the spread operation is performed. The control of moving the starting location of the spread operation may be performed based on the average wind speed and average wind direction in the predetermined time period. In addition, after the operation starting location is moved, the current wind speed information may be obtained. When the deviation in the spread region corresponding to the wind speed exceeds the maximum allowable deviation, controls may be performed to reduce the height of the aircraft. As such, in this embodiment, by adjusting the operation starting location based on the wind speed and the wind direction, the spread region may be adjusted, thereby reducing the effect of the wind. As such, the deviation of the spread region at the current wind speed may be controlled within the maximum allowable deviation range. As a result, a suitable spread operation may be implemented. In addition, by adjusting the height based on the wind speed in the operation region, the spread region may be fine tuned after the spread location is adjusted, thereby reducing the effect of the wind. As a result, high-efficiency spread operation may be performed. As described above, according to this embodiment, the efficiency of the spread operation may be enhanced while maintaining a suitable spread operation.

According to the present disclosure, the wind information such as the wind speed information and the wind direction information may be obtained. The flight locations such as the flight height of the aircraft, the spread operation starting location can be controlled based on the wind speed and wind direction in the operation region during the spread operation. As such, when there is a wind in the current operation region, the effect of the wind can be reduced, and the deviation in the spread region may be controlled within the allowable deviation. As a result, a suitable spread operation may be performed. By adjusting the flight height of the aircraft, the starting location of the spread operation, and the flight path for the spread operation, the efficiency of the spread operation can be enhanced.

According to the present disclosure, when the deviation of the spread region corresponding to the wind speed in the operation region exceeds the maximum allowable deviation, the effect of the wind during the spread operation can be reduced by reducing the height of the aircraft. The height of the aircraft may be increased when the deviation of the spread region does not exceed the maximum allowable deviation range, thereby increasing the operation efficiency.

The wind speed information may be obtained regularly at a predetermined time interval. The height of the aircraft may be adjusted at a predetermined time interval based on the wind speed, thereby maintaining a suitable spread operation. The starting location of the spread operation performed by the aircraft may be changed based on the deviation in the spread region corresponding to the wind speed and the wind direction in the operation region, thereby reducing the effect of the wind during the spread operation.

In addition, in the above embodiments, examples of an information processing device included in any of the UAV 100 and the terminal 50 that may be configured to execute the steps of the flight control methods are described. It is understood that the steps of the flight control method may be executed by an information processing device in other platforms.

The above describes the present disclosure based on certain embodiments. The technical solution of the present disclosure is not limited to the embodiments described herein. A person having ordinary skills in the art may modify or improve the embodiments through various manners. It can be understood from the claims that such modifications or improvements all fall within the technical scope of the present disclosure.

The claims, specification, and the device, system, program shown in the drawings accompanying the specification, and the execution orders of the various processes such as the actions, order, steps, and stage of the methods, unless explicitly noted "prior to" or "a priori", etc., as long as the output of a preceding process is not used in a latter process, any order may be implemented. Regarding the claims, the specification, and the operation flows in the drawings accompanying the specification, they may have been described with terms such as "first," "next," for convenience, it does not mean that such order is necessarily followed.

REFERENCE NUMERAL DESCRIPTION

- 10 flight control system
- 50 terminal
- 51 processing device
- 52 memory
- 53 wireless communication member
- 54 display device
- 55 operation device
- 56 interface
- 57 storage device
- 58 battery
- 100 unmanned aerial vehicle ("UAV")
- 102 UAV body
- 110 controller
- 120 memory
- 130 rotor mechanism
- 140 GPS receiver
- 150 inertial measurement unit
- 160 magnetic compass
- 170 barometric altimeter
- 180 millimeter wave radar
- 190 wind speed and wind direction gauge
- 200 nozzle
- 210 material storage tank
- 220 pressure sensor
- 230 flow sensor
- 240 storage device
- 250 communication interface
- 260 battery

What is claimed is:

1. A flight control method for controlling an aircraft, comprising:
   obtaining wind information of a spread region during a spread operation performed by the aircraft; and
   controlling a flight location of the aircraft based on the wind information and an allowable deviation of the spread region in the spread operation, the allowable deviation including an allowable deviation range, and controlling the flight location of the aircraft including:
     calculating a deviation of the spread region corresponding to the wind information, the deviation of the spread region indicating a difference between an actual spread region and a target spread region; and
     controlling the flight location of the aircraft based on the deviation of the spread region and the allowable deviation of the spread region, to cause the actual spread region to be within the allowable deviation range;
   wherein the allowable deviation of the spread region is determined based on a spread object to be spread on the spread region and a nozzle for spreading the spread object.

2. The flight control method of claim 1, wherein controlling the flight location further comprises:
   controlling a height of the aircraft.

3. The flight control method of claim 1, wherein controlling the flight location of the aircraft further comprises:
   adjusting a starting location of the spread operation performed by the aircraft.

4. The flight control method of claim 1,
   wherein obtaining the wind information comprises obtaining wind speed information of the spread region, and
   wherein controlling the flight location further comprises:
     calculating the deviation of the spread region corresponding to a wind speed in the spread region;
     determining whether the deviation of the spread region exceeds a maximum allowable deviation; and
     adjusting a height of the aircraft based on a result of the determination.

5. The flight control method of claim 4, wherein controlling the flight location comprises:
   performing a control to reduce the height of the aircraft when the deviation of the spread region exceeds the maximum allowable deviation.

6. The flight control method of claim 4, wherein controlling the flight location comprises:
   performing a control to increase the height of the aircraft when the deviation of the spread region does not exceed the maximum allowable deviation.

7. The flight control method of claim 4,
   wherein obtaining the wind speed information comprises obtaining the wind speed information regularly at a predetermined time interval, and
   wherein controlling the height of the aircraft comprises adjusting the height of the aircraft regularly based on the wind speed at a predetermined time interval.

8. The flight control method of claim 1,
   wherein obtaining the wind information comprises obtaining wind speed information and wind direction information in the spread region, and
   wherein controlling the flight location further comprises:
     calculating the deviation of the spread region based on a corresponding wind speed and a wind direction in the spread region; and changing a starting location of the spread operation performed by the aircraft based on the deviation of the spread region.

9. The flight control method of claim 8, wherein controlling the flight location further comprises:
moving the starting location of the spread operation in a direction opposite the wind direction to offset the deviation of the spread region.

10. The flight control method of claim 1, wherein controlling the flight location of the aircraft based on the wind information and the allowable deviation of the spread region in the spread operation further includes:
comparing the calculated deviation of the spread region with the allowable deviation of the spread region to obtain a comparison result; and
controlling the flight location of the aircraft based on the comparison result.

11. The flight control method of claim 1, wherein:
the allowable deviation for a first combination of a first spread object to be spread and a first nozzle is different from the allowable deviation for a second combination of a second spread object to be spread and a second nozzle, the first combination being different from the second combination.

12. An information processing device for controlling a flight of an aircraft, comprising:
a controller configured to execute processing relating to control of the flight,
wherein the controller is configured to:
obtain wind information of a spread region during a spread operation performed by the aircraft; and
control a flight location of the aircraft based on the wind information and an allowable deviation of a spread region during the spread operation, the allowable deviation including an allowable deviation range, and controlling the flight location of the aircraft including:
calculating a deviation of the spread region corresponding to the wind information, the deviation of the spread region indicating a difference between an actual spread region and a target spread region; and
controlling the flight location of the aircraft based on the deviation of the spread region and the allowable deviation of the spread region, to cause the actual spread region to be within the allowable deviation range;
wherein the allowable deviation of the spread region is determined based on a spread object to be spread on the spread region and a nozzle for spreading the spread object.

13. The information processing device of claim 12,
wherein the controller is further configured to control a height of the aircraft during the control of the flight location.

14. The information processing device of claim 12,
wherein the controller controls the flight location, the controller is further configured to adjust a start location of the spread operation performed by the aircraft.

15. The information processing device of claim 12,
wherein when the controller obtains the wind information, the controller is configured to obtain wind speed information in the spread region, and
wherein when the controller controls the flight location, the controller is configured to:
calculate the deviation of the spread region corresponding to a wind speed in the spread region;
determine whether the deviation of the spread region exceeds a maximum allowable deviation; and
adjust a height of the aircraft based on a result of the determination.

16. The information processing device of claim 15,
wherein when the controller controls the flight location, the controller is configured to perform a control to reduce the height of the aircraft when the deviation of the spread region exceeds the maximum allowable deviation.

17. The information processing device of claim 15,
wherein when the controller controls the flight location, the controller is configured to perform a control to increase the height of the aircraft when the deviation of the spread region does not exceed the maximum allowable deviation.

18. The information processing device of claim 15,
wherein when the controller obtains the wind information, the controller is configured to regularly obtain the wind speed information at a predetermined time interval, and
wherein when the controller adjusts the height of the aircraft, the controller is configured to regularly adjust the height of the aircraft based on the wind speed at a predetermined time interval.

19. The information processing device of claim 12,
wherein when the controller obtains the wind information, the controller is configured to obtain wind speed information and wind direction information in the spread region, and
wherein when the controller controls the flight location, the controller is configured to calculate a deviation of the spread region corresponding to a wind speed and a wind direction, and changing a starting location of the spread operation performed by the aircraft based on the deviation of the spread region.

20. The information processing device of claim 19,
wherein when the controller controls the flight location, the controller is configured to move the starting location of the spread operation in a direction opposite the wind direction to offset the deviation of the spread region.

* * * * *